US012033075B2

United States Patent
Orhon

(10) Patent No.: US 12,033,075 B2
(45) Date of Patent: Jul. 9, 2024

(54) TRAINING TRANSFORMER NEURAL NETWORKS TO GENERATE PARAMETERS OF CONVOLUTIONAL NEURAL NETWORKS

(71) Applicant: Apple Inc., Cupertino, CA (US)

(72) Inventor: Atila Orhon, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 552 days.

(21) Appl. No.: 17/372,367

(22) Filed: Jul. 9, 2021

(65) Prior Publication Data

US 2022/0391693 A1 Dec. 8, 2022

Related U.S. Application Data

(60) Provisional application No. 63/195,904, filed on Jun. 2, 2021.

(51) Int. Cl.
*G06N 3/08* (2023.01)
*G06V 20/10* (2022.01)
*G06V 20/40* (2022.01)

(52) U.S. Cl.
CPC .............. *G06N 3/08* (2013.01); *G06V 20/10* (2022.01); *G06V 20/41* (2022.01)

(58) Field of Classification Search
CPC ........... G06V 20/10; G06V 20/41; G06N 3/08
See application file for complete search history.

(56) References Cited

U.S. PATENT DOCUMENTS

2020/0327671 A1\* 10/2020 Arbel ........................ G06T 7/11
2021/0295105 A1\* 9/2021 Sallee ....................... G06N 3/08

OTHER PUBLICATIONS

ISTR: End-to-End Instance Segmentation with Transformers, pp. 1-11. (Year: 2021).\*
Carion et al., End-to-End Object Detection with Transformers, Cornell University, https://arxiv.org/abs/2005.12872, May 28, 2020, 26 pages.
Ha et al., HyperNetworks, Cornell University, https://arxiv.org/abs/1609.09106, Dec. 1, 2016, 29 pages.

\* cited by examiner

*Primary Examiner* — Daniel G Mariam
(74) *Attorney, Agent, or Firm* — Kilpatrick Townsend & Stockton LLP

(57) ABSTRACT

This application relates to use of transformer neural networks to generate dynamic parameters for use in convolutional neural networks. In various embodiments, received image data is encoded and the encoded signal is sent to both a decoder and a transformer neural network. The decoder outputs a decoded data for input into a convolutional neural network. The transformer outputs a set of dynamic parameter values for input into the convolutional neural network. The convolutional neural network may use the decoded data and the set of dynamic parameter values to output instance image data show identifying a number of objects in an image. In various embodiments, the decoded data is also used to generate semantic data. The semantic data may be combined with the instance data to form panoptic image data.

20 Claims, 15 Drawing Sheets

TRAINING TRANSFORMER NEURAL NETWORKS TO GENERATE PARAMETERS OF CONVOLUTIONAL NEURAL NETWORKS

CROSS-REFERENCE TO RELATED APPLICATIONS

This application is a non-provisional application of and claims the benefit of and priority to U.S. provisional patent application Ser. No. 63/195,904, entitled "TRAINING TRANSFORMER NEURAL NETWORKS TO GENERATE PARAMETERS OF CONVOLUTIONAL NEURAL NETWORKS," filed Jun. 2, 2021, which is herein incorporated by reference in its entirety for all purposes.

FIELD

The described embodiments relate generally to generation of dynamic parameters for input to convolutional neural networks. More particularly, the present embodiments are directed towards using an image encoding to dynamically generate a set of parameter inputs to a convolutional neural network that is configured to generate new data using transformed image data.

BACKGROUND

Image processing and object recognition are resource-intensive tasks. Multiple stages of filtering and interpretation of data are required to process an image and recognize entities within the image. Machine learning techniques improve the speed and accuracy of image recognition tasks. However, existing machine learning techniques still require a great deal of computing resources to parse an image and recognize entities. For example, techniques for image recognition using convolutional neural networks often require separate analyses for each recognizable entity in an image. Resource expenditures to necessary accomplish entity recognition scale with each entity analysis. Resource expenditures become obtrusive when recognizable entities in an image or the number of images to process become more numerous.

SUMMARY

This disclosure describes various embodiments that relate to ways in which a transformer neural network may be used to dynamically generate parameters for a convolutional neural network, which in turn generates image instance data.

A method is disclosed that includes at least: receiving image data depicting one or more objects; encoding the image data to produce encoded image data; inputting the encoded image data into a transformer model to generate one or more dynamic model parameters; decoding the encoded image data to produce decoded image data; inputting the decoded image data and the one or more dynamic model parameters into a compilation model to generate instance image data comprising one or more sets of instance data corresponding to the one or more objects; and sending, to a computing device, the generated instance image data comprising the one or more sets of instance data.

A method is disclosed that includes steps for generating instance image data and further includes at least: wherein the received image data is raw image data comprising one or more channels of raw image data corresponding to color values of an image depicting the one or more objects.

A method is disclosed that includes steps for generating instance image data and further includes at least wherein the decoded image data comprises one or more channels of decoded image data corresponding to extracted features of the received image data.

A method is disclosed that includes steps for generating instance image data using one or more channels of decoded image data and further includes at least wherein at least a channel of decoded image data of the one or more channels of decoded image data corresponds to extracted features of the one or more objects.

A method is disclosed that includes steps for generating instance image data using one or more channels of decoded image data and further includes at least wherein at least a channel of decoded image data of the one or more channels of decoded image data corresponds to extracted features of one or more amorphous regions in the image data.

A method is disclosed that includes steps for generating instance image data and further includes at least generating, based at least on the decoded image data, semantic image data comprising one or more sets of semantic data corresponding to characteristics of one or more amorphous regions of the received image data.

A method is disclosed that includes steps for generating instance image data and generating semantic image data and further includes at least generating, based at least on the one or more sets of instance data and the one or more sets of semantic data, one or more sets of panoptic data corresponding to the one or more objects and the one or more amorphous features.

A method is disclosed that includes steps for generating instance image data and further includes at least wherein encoding the received image data comprises transforming the received image data into encoded pixel data corresponding to a set of characteristics of a set of pixels comprising the received image data.

A method is disclosed that includes steps for generating instance image data using encoded pixel data and further includes at least wherein the transformer model receives the encoded pixel data as input to cause generating the one or more dynamic parameters, the one or more dynamic parameters comprising one or more kernel weight parameters for causing the compilation model to generate the instance image data.

A method is disclosed that includes steps for generating instance image data and further includes at least wherein the compilation model is a dynamically compiled convolutional neural network.

A system is disclosed comprising a camera for capturing image data, a processor, and one or more non-transitory computer-readable storage medium storing a plurality of instructions executable by the processor, the plurality of instructions when executed by the processor causing the processor to perform steps of the methods described herein.

A non-transitory computer-readable storage medium is disclosed storing a plurality of instructions executable by one or more processors, the plurality of instructions executable by the one or more processors to cause the one or more processors to perform steps of the methods described herein.

BRIEF DESCRIPTION OF THE DRAWINGS

The disclosure will be readily understood by the following detailed description in conjunction with the accompanying drawings, wherein like reference numerals designate like structural elements, and in which.

Figure 1:
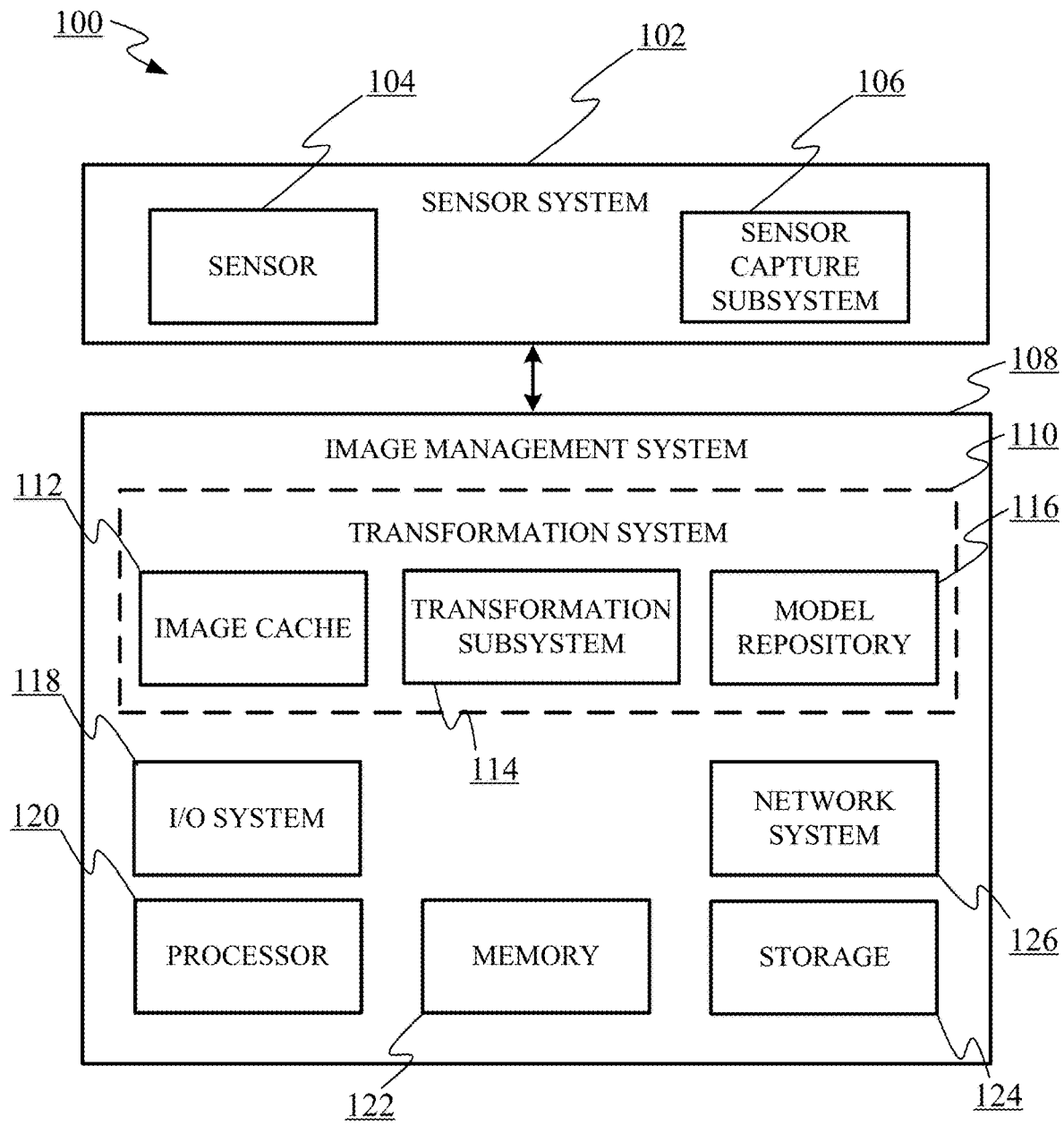
FIG. 1 shows an exemplary system diagram for facilitating dynamic convolutional neural network parameter generation according to various embodiments.

Other aspects and advantages of the disclosed techniques will become apparent from the following detailed description taken in conjunction with the accompanying drawings which illustrate, by way of example, the principles of the described embodiments.

DETAILED DESCRIPTION

Representative applications according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Machine learning techniques including convolutional and transformer neural networks are useful tools for processing image and other data to predict one or more aspects of the data. These techniques may be used to recognize one or more entities in an image by utilizing a comprehensive analysis of an image. However, these techniques require repeating at least a portion of an image parsing process for each of the entities recognized within an image. Resources expended to parse the image and predict these features scales, at best, linearly with the number of entities within an image. What is needed are comprehensive image entity recognition techniques that do not require separate processing procedures for each recognizable entity in an image.

In various embodiments, image data may be received by an image processing system. For example, image data corresponding to a digital image captured by a sensor or camera may be received at an image processing system. The image data may comprise data for a plurality of pixels comprised in the digital image, each pixel of the plurality of pixels having at least three values corresponding to three color channels. The image data may be input to a convolutional neural network encoder for producing encoded image data. The encoded image data may be data comprising encoded features based on original pixel values generated by a convolutional neural network model.

In various embodiments, the encoded pixel data generated by the convolutional neural network encoder may be sent to various systems concurrently. The encoded data may be sent to a convolutional neural network decoder. The convolutional neural network decoder may take, as input, the convolutional neural network encoding of the image to produce output comprising one or more image entity channels. The image entity channels may correspond to a decoding of the encoded image data into multiple entity channels recognized within the image. For example, a convolutional neural network decoder may use the input encoded pixel data to determine one or more characteristics of an image, such as a sky, a ground, clothing, hair, or any other features that may be recognized by a neural network.

In various embodiments, the output decoded data comprising one or more channels may be collected and/or transformed in a semantic data subsystem. A semantic entity may be an amorphous region, background, and/or less-important aspect of a digital image. An object may be "less-important" to an image when the object is static or does not corresponding to an object category, or a number of known object categories. For example, a sky channel of the decoded data may correspond to an amorphous sky region, because the sky has no definite shape in an image.

A grass channel of the decoded data may not be amorphous in shape (i.e. contained within a garden on the ground), but may be part of a background landscape. A building channel of the decoded data may not be amorphous, nor part of a landscape, but may be less-important to the image (i.e., a building is a static entity that does not move and is often not the intended subject of a captured digital image). The semantic channels captured from the decoded data may be further utilized as part of a panoptic image generation process.

In various embodiments, the encoded pixel data is sent to one or more transformer neural networks. The encoded pixel data may be used as input to a transformer neural network to cause output of one or more parameter values. The output one or more parameter values may correspond to a predicted number of object instances depicted in the digital image. For example, a transformer neural network may receive encoded pixel data as input. The encoded pixel data may be parsed to determine one or more groupings of pixels corresponding to one or more predicted instances of objects in a digital image. In various embodiments, the one or more parameters comprise one or more dynamic weight values, the one or more dynamic weight values corresponding to kernel weight parameters for defining the function of a convolutional neural network machine learning model.

In various embodiments, the decoded data and the one or more parameters are input to a dynamically compiled convolutional neural network. The dynamically compiled convolutional neural network may be configured to receive, as input, the decoded data. The decoded data may be input to a machine learning model comprised in the dynamically compiled convolutional neural network operating according to the one or more parameters output from the transformer neural network. The dynamically compiled convolutional neural network may be further configured to output instance image data corresponding to an image comprising one or more predicted objects represented in a number of channels. In various embodiments, the channels of the instance image data are similar to the pixel-grouping parameters output by the transformer neural network.

In various embodiments, the instance image data may be combined with semantic data to form panoptic image data. For example, instance image data comprising one or more object instances may be combined with semantic regions of an image to generate an image comprising both object instances and semantic regions.

In various embodiments, data generated according to the processes described herein may be sent to one or more components of a system or stored by components of a system to facilitate additional processes using the generated data. For example, generated image instance data may be sent to a data generation component to generate metadata relating to one or more instance objects recognized within an image. In another example, generated panoptic image data may be sent to a digital image processing application for causing changes to a digital image based on the panoptic data. In another example, generated data may be stored and associated with an existing digital image used as input for the processes described herein.

Utilization of transformer neural networks to produce dynamic input parameters for a dynamically compiled convolution neural network improves image parsing and entity recognition processes for digital images while requiring less resources. Because the transformer neural network may use image encodings to predict number of instances in an image and dynamically generate input parameters for a convolutional neural network for deriving instance data from an image, image parsing need only be done once, regardless of the number of recognizable objects present in an image. This greatly improves image parsing capabilities while simultaneously improving resource utilization by image parsing systems.

These and other embodiments are discussed below with reference to FIGS. 1-8D; however, those skilled in the art will readily appreciate that the detailed description given herein with respect to these figures is for explanatory purposes only and should not be construed as limiting.

FIG. 1 shows an exemplary system diagram for facilitating dynamic convolutional neural network parameter generation according to various embodiments. Specifically, FIG. 1 depicts an example system 100. System 100 may comprise sensor system 102. Sensor system 102 may be a system capable of perceiving and capturing data regarding physical features of an environment. In various embodiments, sensor system 102 is a camera coupled to a mobile device. Sensor system 102 may comprise sensor 104. Sensor 104 may be a hardware device capable of transforming captured physical features into digital data. For example, sensor 104 may be camera hardware comprising a lens, image sensor, pixel converter, etc.

Sensor system 102 may further comprise sensor capture subsystem 106. Sensor capture subsystem 106 may be a subsystem capable of receiving input from sensor 104 and converting the input to digital data. For example, sensor capture subsystem 106 may be a digital image conversion computer chip or other hardware which takes, as input, raw pixel data from sensor 104 and converts the raw pixel data to a structured digital image. The structured digital image may comprise a known image format, such as a Joint Photographic Experts Group (JPEG) format, a Portable Graphics Format (PNG), or any other format that may be used as part of the embodiments described herein.

System 100 may further comprise an image management system 108 communicatively coupled to the sensor system 102. In various embodiments, the image management system 108 is configured to receive input from sensor system 102, the input comprising image data corresponding to a digital image. Image management system 108 may comprise transformation system 110. Transformation system 110 may be a system such as a hardware system or a software package operating on a mobile device which transforms received digital image into instance image data or panoptic image data according to the embodiments described herein. Transformation system 110 may comprise image cache 112. Image cache 112 may be a memory and/or electronic storage medium capable of storing digital images. For example, image cache 112 may store digital images or image data in a volatile or non-volatile memory during image data transformation processes. Transformation system 110 may further comprise transformation subsystem 114. Transformation subsystem 114 may be a system or subsystem for transforming image data to form instance image data or panoptic image data using machine learning models according to the embodiments described herein. Details regarding transformation subsystem 114 are discussed further below, including in FIG. 2.

Transformation system 110 may further comprise model repository 116. Model repository 116 may be a repository, memory, or storage medium comprising one or more machine learning models for performing the embodiments described herein. In various embodiments, model repository 116 may be a repository comprising one or more encoder convolutional neural networks, one or more decoder convolutional neural networks, one or more transformer neural networks and one or more dynamically compiled convolutional neural networks. Image management system 108 may further comprise one or more hardware and/or software entities or systems for facilitating the processes described herein.

Image management system 108 may further comprise I/O system 118. I/O system 118 may be a system that facilitates input and output of image management system 108. I/O system 118 may facilitate interaction with an interface which begins or continues to processes described herein. For example, I/O system 118 may be associated with a user interface through which a user may request performance of the processes described herein. In another example, I/O system 118 may be associated with an application interface, such as a digital camera application, which causes automatic performance of the processes described herein. In various embodiments, I/O system 118 may be communicatively coupled to a dynamic-input touchscreen hardware device capable of displaying digital images and accepting input from a user of the dynamic-input touchscreen hardware device.

Image management system 108 may further comprise processor 120. Processor 120 may be a hardware device executing software-based instructions to facilitate the processes described herein. In various embodiments, processor 120 is communicatively coupled to various systems of hardware and software in image management system 108 and/or to a mobile device comprising image management system 108. For example, processor 120 may be a mobile processor capable of processing instructions to perform the embodiments described herein as well as perform functions associated with a mobile device concurrently. Image management system 108 may further comprise memory 122. Memory 122 may a transitory or non-transitory computer-readable storage medium capable of storing a plurality of instructions which are executable by a processor, such as processor 120. Memory 122 may comprise volatile memory operable when receiving electric power or non-volatile memory such as a hard disk, a solid state drive, etc.

Image management system 108 may further comprise storage 124. Storage 124 may be a volatile or non-volatile electronic storage medium capable of storing data for facilitating the embodiments described herein. For example, storage 124 may be a mobile device storage device communicatively coupled to storage elements, such as model repository 116. Image management system 108 may further comprise network system 126. Network system 126 may be a system for facilitating network-based communication with one or more entities external to image management system 108. For example, network system 126 may be a wireless network card installed in a mobile device comprising image management system 108 for communication with an external processing entity. In various embodiments not depicted in FIG. 1, image management system is a server system configured to communicate remotely with one or more mobile devices through network system 126 to facilitate the embodiments described herein using computing resources associated with image management system 108 instead of the one or more mobile devices.

Figure 2:
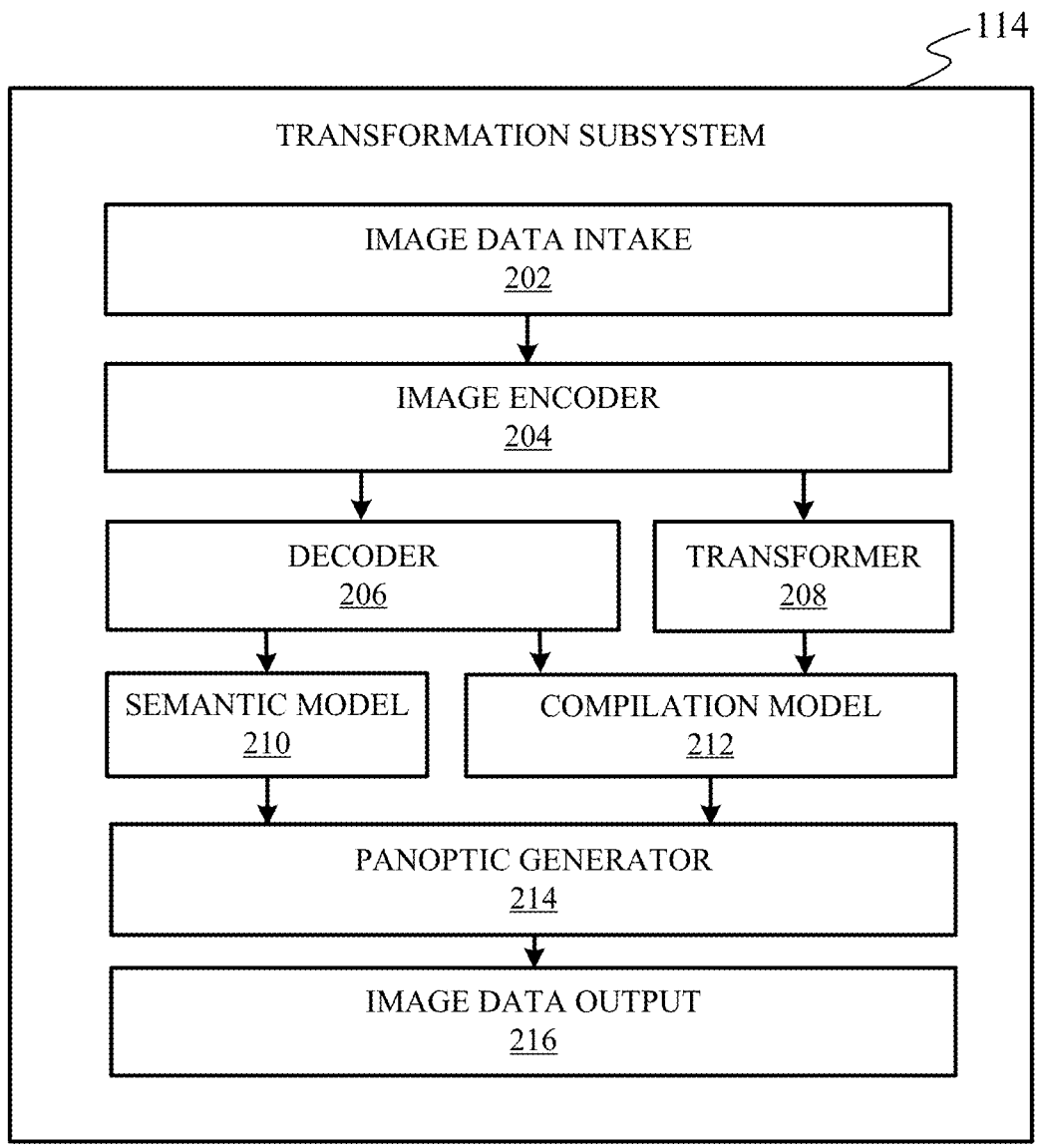
FIG. 2 shows an exemplary block diagram of a transformation subsystem for generating instance image data according to various embodiments.

FIG. 2 shows an exemplary block diagram of a transformation subsystem for generating instance image data according to various embodiments. Specifically, FIG. 2 depicts transformation subsystem 114 and components comprises therein for facilitating the processes described herein. In various embodiments, transformation subsystem 114 comprises image data intake 202. Image data intake 202 may be a subsystem for receiving image data corresponding to a digital image. For example, image data intake 202 may be a subsystem for interfacing with a digital image generation system, such as sensor system 102.

Transformation subsystem 114 may further comprise image encoder 204. Image encoder 204 may be a data encoding system for receiving data, such as image data, and encoding the data according to an encoding protocol. In various embodiments, image encoder 204 is a convolutional neural network encoder employing a machine learning model for generating encoded image data. The machine learning model may be trained, tested, and refined at various time periods or intervals to improve the function of the machine learning model.

In various embodiments, the convolutional neural network encoder is a static encoder comprising a machine learning model which has already been trained, but may accept new parameters to alter the function of the model. In various embodiments, image encoder 204 take in input comprising image data, such as digital image data in an image format. In various further embodiments, image encoder 204 uses the input to output pixel data corresponding to the one or more pixels of an input digital image. For example, image encoder 204 may output pixel data in an array of values, each value in the array of values corresponding to some aspect of a pixel in the digital image.

Transformation subsystem 114 may further comprise decoder 206. Decoder 206 may be a convolutional neural network decoder for decoding encoded image data. In various embodiments, decoder 206 receives encoded image data from image encoder 204 which may be used as input for decoder 206. In various embodiments, decoder 206 takes in encoded pixel data from image encoder 204 to output one or more image channels. The one or more image channels may correspond to one or more aspects of an image or entities within an image. For example, a convolutional neural network decoder may use the encoded pixel data to predict the presence of one or more entities each corresponding to one or more channels. For example, decoder 206 may utilize encoded pixel data to determine that a particular cluster of pixels in an image correspond to an afternoon sky on a partly-cloudy day. This cluster of pixels then belongs to a "sky" channels recognized by the decoder 206.

Transformation subsystem 114 may further comprise semantic model 210. Semantic model 210 may be a model which takes in, as input, one or more semantic channels of data output from the decoder 206. For example, semantic model 210 may receive the decoded image data in the one or more channels. Semantic model 210 may then use the received channels of data to identify one or more semantic portions of a digital image. The one or more semantic portions may be associated with groupings of pixels in the digital image.

Transformation subsystem 114 may further comprise transformer 208. In various embodiments, transformer 208 comprises a transformer convolutional neural network. The transformation convolutional neural network may comprise a machine learning model capable of taking in, as input encoded image data. The transformer 208 may use input encoder image data, such as data output from image encoder 204, the generation an output. In various embodiments, transformer 208 generates, as output, one or more parameters, the one or more parameters utilizable by a dynamically compiled convolutional neural network. In various embodiments, the one or more parameters output by the transformer 208 correspond to a number of expected or predicted instance entities within an image. For example, the transformer 208 may parse the input encoded pixel data to determine one or more regions of a digital image which may correspond to instances of an object.

An object may be any entity within a digital image which is not semantic. For example, humans, cars, animals, or other objects of interest which are not amorphous and may appear in non-single numbers may be instance objects. Transformer 208 may predict, using a machine learning model and based on the encoded pixel data, one or more groupings of pixels that may correspond to an object instance. In various embodiments, the transformer 208 selects, based on the encoded pixel data, one or more instances types and subsequently parses the pixel data to determine a maximum expected number of instances of the instance types.

In various embodiments, transformer 208 outputs, as one or more parameters, one or more weight values. The one or more weight values may be used weighted parameters for operating a dynamically compiled convolution neural network machine learning model. The one or more weights may alter the manner in which the convolutional neural network machine learning model operates based on the configuration of the weight values. For example, the weight values may indicate that one or more automobiles are likely present in a digital image, and may be configured to cause a convolutional neural network model to more heavily weight decoded image channels such as "tire," license plate," "headlight," etc. in determining one or more image instances.

Transformation subsystem 114 may further comprise compilation model 212. In various embodiments, compilation model 212 is a dynamically compiled convolutional neural network. Compilation model 212 may comprise a convolutional model for determining one or more instances of an object in a digital image. In various embodiments, compilation model 212 may take in, as input, decoded image data comprising one or more image channels. For example, decoded image data received from decoder 206 may comprise detected channels of an image, such as "sky," "ground," "tire," "license plate," "building," etc. The compilation model 212 may also take in, as operational parameters, the one or more parameters of transformer 208. The compilation model 212 may then use the one or more parameters to configure a machine learning model to take in decoded image data as input and output instance image data corresponding to a number of detected instances of objects in a digital image. In various embodiments, the one or more channels of image information in the decoded image data may be mapped to a new number of instances channels in the machine learning model according to the one or more parameters.

Transformation subsystem 114 may further comprise panoptic generator 214. Panoptic generator 214 may be a system for generating a panoptic image based on instance image data and semantic image data. For example, panoptic generator 214 may take in, as input, instance image data from the compilation model 212 and semantic data from the semantic model 210 to generate a panoptic image comprising indications of both instances of objects in a digital image and semantic elements of the digital image. Transformation subsystem 114 may further comprise image data output 216. Image data output 216 may be a system or subsystem for outputting a generated panoptic image, such as a panoptic image generated by panoptic generator 214, to another system, such as an application or interface operated by I/O system 118.

Figure 3:
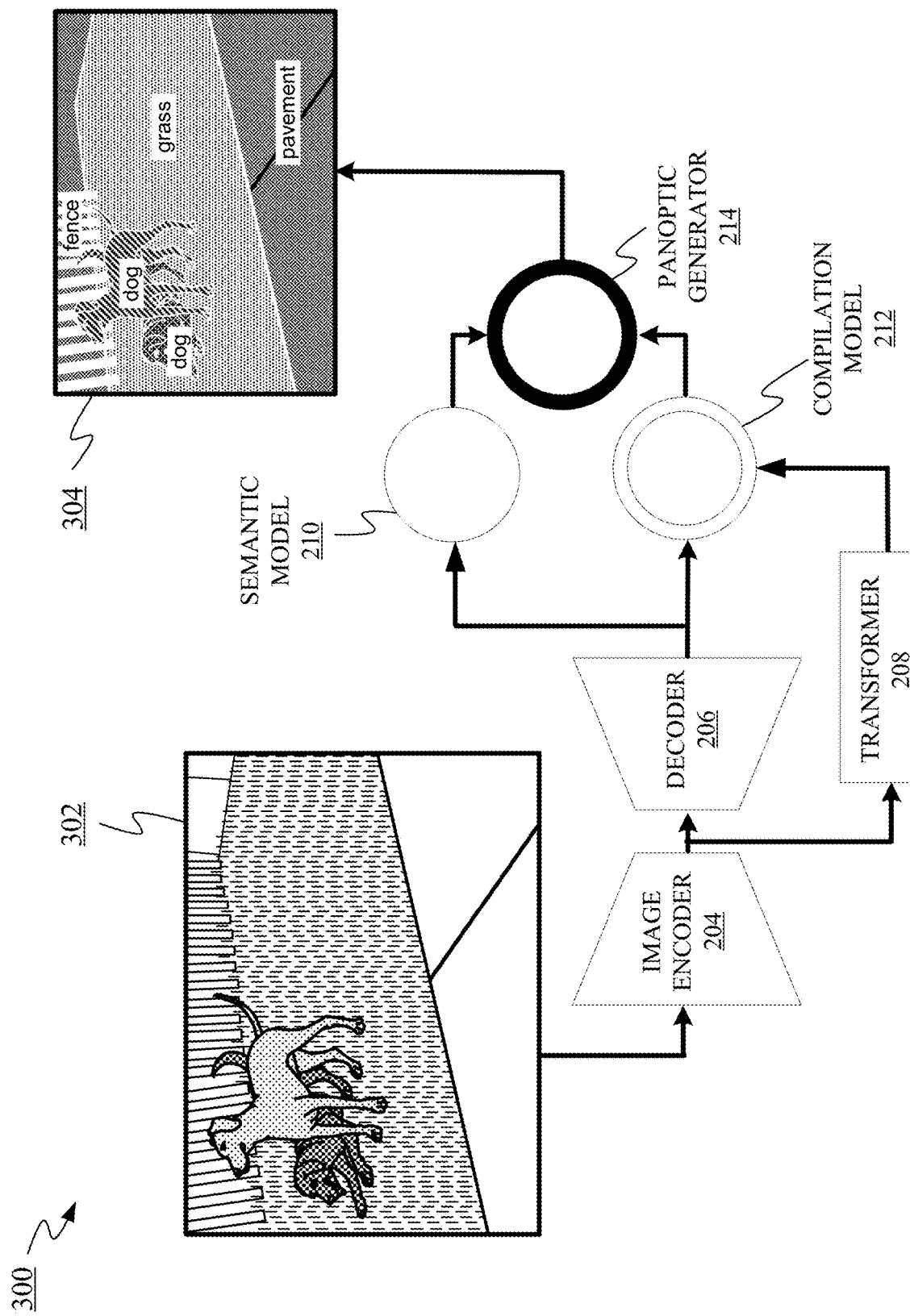
FIG. 3 shows a diagram and flow of system components and data for generating panoptic image data from raw image data according to various embodiments.

FIG. 3 shows a diagram and flow of system components and data for generating panoptic image data from raw image data according to various embodiments. Specifically FIG. 3 depicts a diagram and flow of data among subsystems for generating panoptic image data. FIG. 3 comprises system 300. System 300 may receive, as input, raw image data such as raw digital image data 302. As depicted in FIG. 3, raw digital image data 302 may be a digital photograph in a digital format, such as a JPG, that depicts a number of objects and a number of separate regions. For example, raw digital image data 302 depicts two dogs standing on a grassy field in front of a fence, and behind a sidewalk.

Image encoder 204 may be an encoder system including a convolutional neural network system and/or model for encoding image data. In various embodiments, image encoder 204 receives, as input, raw digital image data 302. Raw digital image data 302 in input into image encoder 204 to produce encoded image data. The encoded image data may thereafter be routed independently and in parallel to additional entities of system 300. For example, encoded image data may be routed to decoder 206 and transformer 208. Decoder 206 may be a decoder which accepts, as input, encoded image data encoded from raw digital image data 302. In various embodiments, decoder 206 is configured to accept encoded pixel data from an image encoder as input. In various embodiments, decoder 206 is configured to determine a type of input coming from image encoder 204. In response to determining the type of input, decoder 206 may access one or more decoding models for decoding that type of input. In various embodiments, decoder 206 comprises a convolutional neural network system and/or model for decoding input encoded image data such as encoded data taken from raw digital image data 302.

In parallel to the decoder 206 receiving the encoded image data, the transformer 208 may also receive encoded image data. Transformer 208 may be a transformer which accepts, as input, encoded image data, such as encoded data taken generated from raw digital image data 302. In various embodiments, transformer 208 is configured to accept encoded pixel data from an image encoder as input. In various embodiments, transformer is configured to determine a type of input coming from image encoder 204. In response to determining the type of input, transformer 208 may access one or more transformational neural network models for processing that type of input. In various embodiments, transformer 208 is configured to process input encoded image data to produce one or more model parameters. Model parameters may be data parameters and/or values in format acceptable for input and use by a dynamically compiled convolutional neural network. In various embodiments, transformer 208 utilizes a transformer neural network to map one or more inputs, such as encoded pixel data, into one or more dynamically compiled parameters. In various embodiments, transformer 208 utilizes a transformer neural network to determine one or more weight parameters. In various embodiments, the one or more weight parameters may be input into a dynamically compiled convolutional neural network to alter the function the neural network to predict one or more channels of output. For example, one or more weight parameters may alter the function of a dynamically compiled convolutional neural network model to be biased toward predicting a certain number of output channels, toward utilizing particular nodes of a convolutional neural network more heavily, etc. For example, the transformer 208 may take, as input, encoded image data generated from raw digital image data 302. The transformer 208 may be trained, using a machine learning model, to output a number of expected instance channels to be determined by another convolutional neural network. For example, the weights produced by transformer 208 may be used to bias a convolutional neural network model to attempt to detect two instances of objects in a set of decoded image data (corresponding to a machine learning model-assisted prediction that two instances of objects appear in the raw image data).

Decoder 206 may be configured to take in, as input, encoded image data to cause outputting of decoded image data. In various embodiments, decoded image data is image data comprising one or more channels. In various embodiments, the one or more channels comprise learned image representations that may be combined to represent certain types of entities within a digital image such as amorphous regions representing "grass," "sidewalk," "pavement," "fence", "wood" etc. or object instances such as "dogs", "people", "cars" etc.

The decoded image data may be input, independently and in parallel, to one or more entities in system 300. In various embodiments, the decoded image data may be input to one or more semantic models such as semantic model 210. Semantic model 210 may be a convolutional neural network system and/or model which is configured to receive, as input, decoded image data comprising one or more channels. The semantic model 210 may parse the one or more semantic channels of the image data to determine one or more amorphous, background, or otherwise known semantic shapes, regions or configurations. The semantic model 210 may then store information related to a semantic image, the semantic image comprising one or more indications of one or more known semantic regions of a digital image. In various embodiments, the semantic model 210 may output semantic image data comprising one or more known semantic regions of a digital image. For example, semantic model 210 may utilize a trained convolutional neural network to parse the input semantic channels generated from raw digital image data 302 and output a number of channels, such as "grass," "pavement," and "fence," based on predictions made by the trained convolutional neural network machine learning model.

The decoded image data may also be input, independently and in parallel, to a dynamically compiled convolutional neural network such as compilation model 212. In various embodiments, compilation model 212 is a dynamically compiled convolutional neural network configured to receive decoded image data as input and parse the data according to one or more dynamically generated model parameters output from a transformer. In various embodiments, compilation model 212 utilizes one or more convolutional mapping models to cause mapping between one or more channels of decoded image data and one or more instance channels according to the one or more model parameters. For example, compilation model 212 may be configured to intake "X" channels of image data, and parse the channels according to "w" operations parameters to produce "N" channels of instance data, wherein "X" is a number of channels selected from decoded image data, "w" is a number of convolutional kernel weights generated by a transformer, and "N" is a number of detected instances of objects in a digital image. The output instance image data of compilation model 212 may comprise the one or more instance channels corresponding to "N" predicted instances of an object category in a raw digital image. For example, compilation model 212 may intake the decoded image data generated from raw digital image data 302 and a number of convolution kernel weight parameters for biasing a dynamically configured convolutional neural network machine learning model to predict two instances of objects using the input decoded image data to output instance data corresponding to two predicted instances of dogs depicted in the original raw digital image data 302.

In various embodiments, system 300 may comprise a combination model for generating panoptic data, such as panoptic generator 214. In various embodiments, panoptic generator 214 is configured to receive, as input, instance image data and semantic image data. For example, the panoptic generator 214 may intake instance image data, such as two-channel instance data representing regions depicting two instances of dogs in the raw image data, and semantic image data, such as three channel data representing regions depicting semantic shapes corresponding to grass, fence, and pavement. The panoptic generator 214 may then be configured to use the input to generate panoptic image data. The panoptic image data may be a combined digital image comprising both instance indicators for one or more instance objects and semantic indicators for one or more semantic regions. In various embodiments, the panoptic generator 214 may represent instance regions from the instance image data and semantic regions from the semantic image data, in different color-coded regions of newly generated panoptic digital image data, such as panoptic digital image data 304. For example, as depicted in FIG. 3, panoptic digital image data comprises a digital image, in a format such as a JPEG, that resembles raw digital image data 302 in a color-coded format. As depicted in FIG. 3, each predicted instance region of a dog is depicted as a different shade of color within the panoptic digital image data 304. Additionally, each regional instance of a semantic region is depicted as a shade of color different from both the other semantic regions of the image, as well as each of the instances of objects in the panoptic digital image data 304.

Figure 4A:
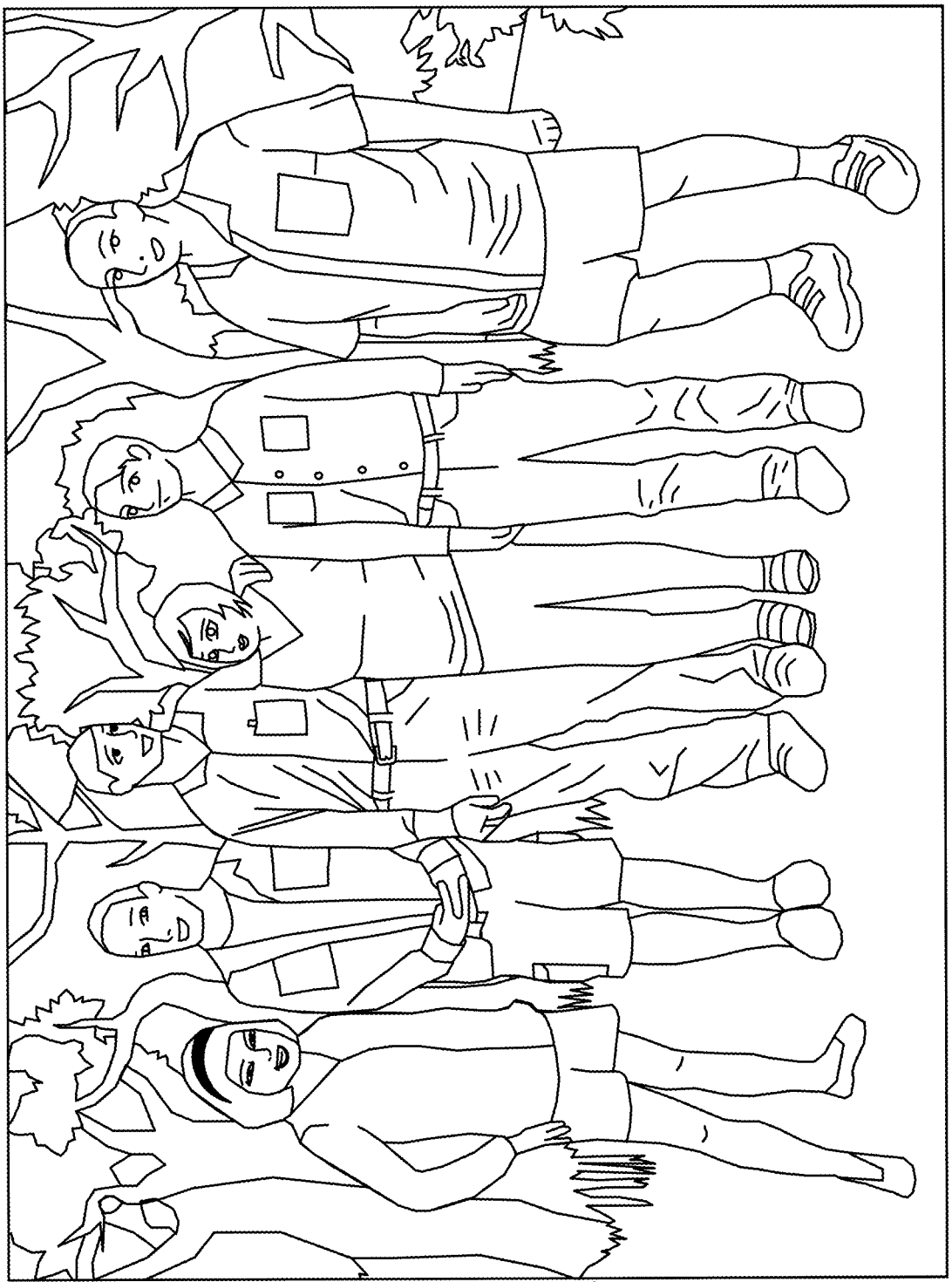
FIGS. 4A-4D shows exemplary digital images illustrating compositions of images data during various steps of a process for generating panoptic image data according to various embodiments.

FIGS. 4A-4D shows exemplary digital images illustrating compositions of images data during various steps of a process for generating panoptic image data according to various embodiments. Specifically, FIGS. 4A-4D depict examples of a digital images in various formats during data transformation processes described herein. FIG. 4A depicts digital image 400 in a typical format. The format of digital image 400 may be a JPEG, PNG, or some other format typically associated with captured digital images. In various embodiments, digital image 400 is raw image data comprising a plurality of pixel values corresponding to at least three color channels. In various embodiments, digital image 400 is a digital image captured by a sensor such as sensor 104 of sensor system 102.

As depicted in FIG. 4A, the example digital image 400 comprises a plurality of human beings. Each human is a distinct instance entity of a human being. Each of the human beings wears different clothing and has different facial features, but each is a human being. The human beings in the digital image 400 are standing on a grounded area which is not finite and is amorphous. The human beings are also standing in front of foliage which is somewhat finite in shape but is comprised in the "background" of the image. Above the other entities is a portion of the sky which is not finite and is amorphous. In various embodiments, digital image 400 is raw image data which may be input into a convolutional neural network decode to generate encoded data, such as pixel data, corresponding to comprehensive values associated with each pixel.

Figure 4B:
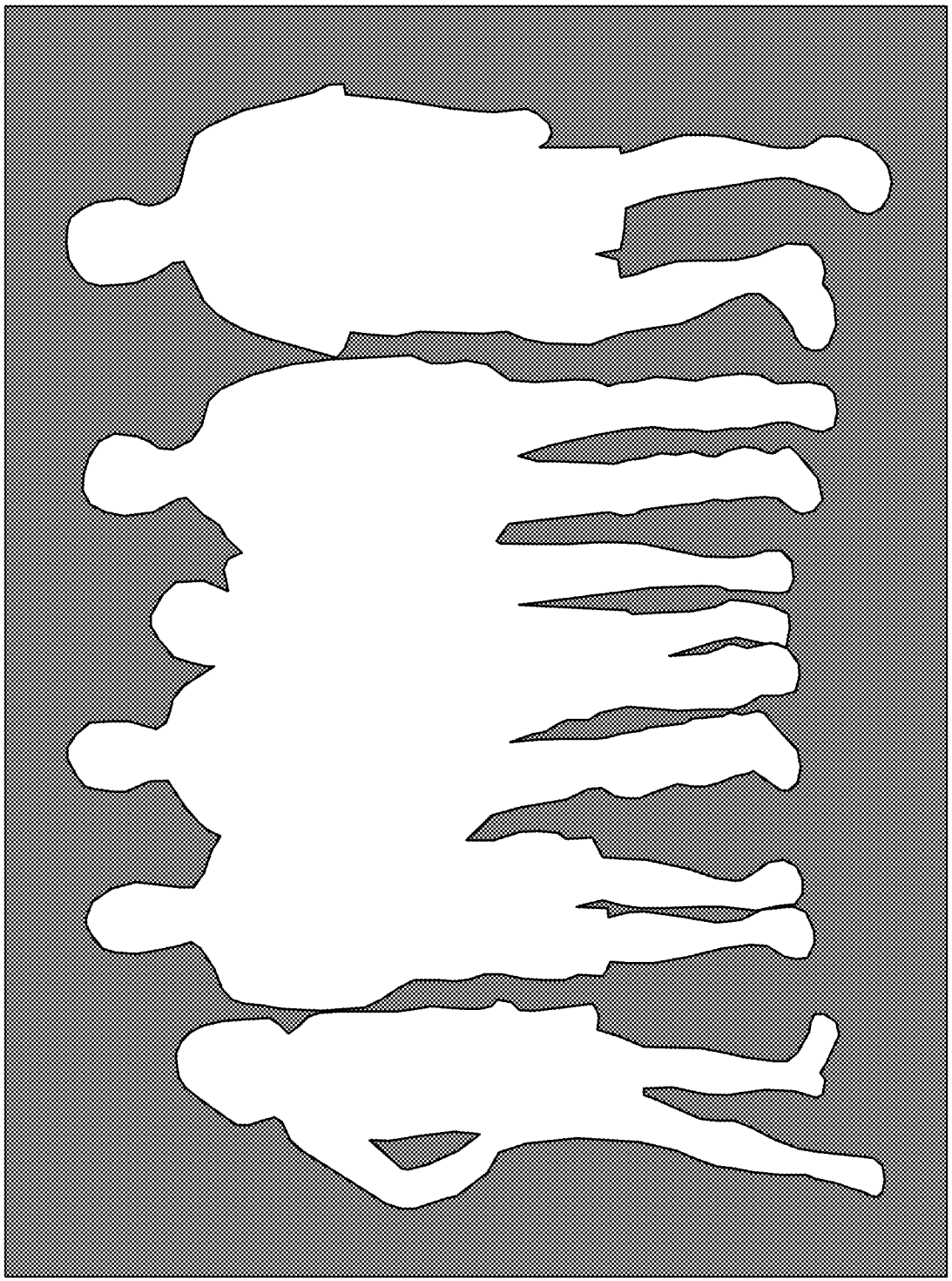

FIG. 4B depicts digital image 402 in a decoded image format. The format of digital image 402 may be a multichannel image corresponding to recognized channels of the digital image. For example, one channel of the image may be a channel for human beings which may be represented by white regions in digital image 402. In various embodiments, similar categories of channels may be represented by similar colors in the multi-channel image. For example, channels for faces, hair, clothing, and bodies may all be associated with a color channel such as white.

A number of semantic and/or amorphous channels may be associated with a different color. For example, any channels associated with background or amorphous regions such as ground, foliage, and sky may be represented by similar colors in an image, such as black. In various embodiments, digital image 402 is a digital image constructed by according pixel color values to the one or more channels of decoder image data. A digital image such as digital image 402 may be formed from decoded image data to visually represent one or more determined image channels. For example, each channel which is associated with aspects of a human may be represented by pixel values corresponding to the color white, and each channel not associated with aspects of a human may be represented by pixel values corresponding to the colors black or gray.

Figure 4C:
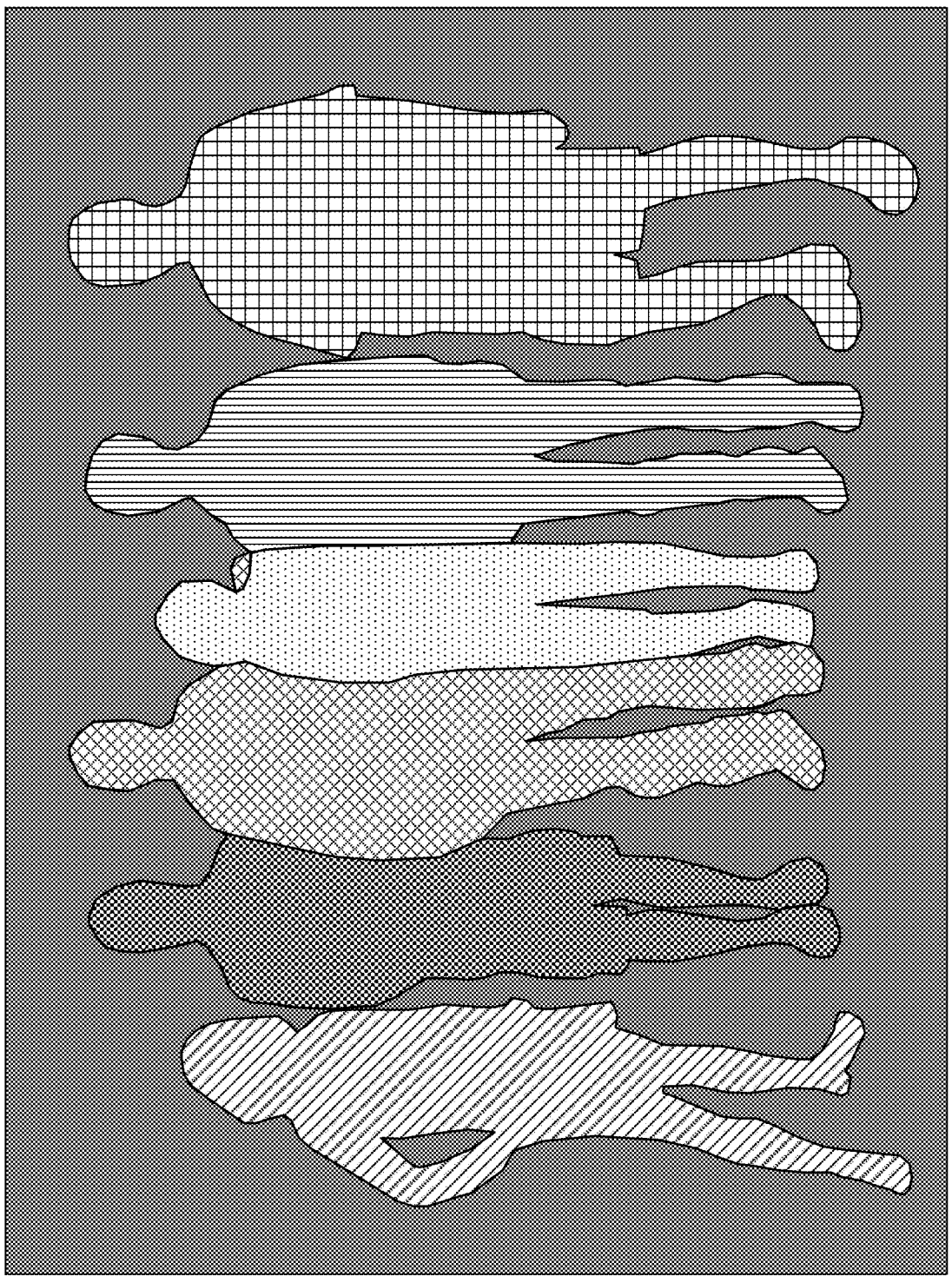

FIG. 4C depicts digital image 404 in an instance-channel image format. The instance-channel image format may correspond to generated instance image data generated as output of a dynamically compiled convolutional neural network and model. The format of digital image 404 may be a multi-channel image corresponding to recognized instances in the digital image 404. Each channel of a plurality of channels comprised in instance image data may represent one instance of an object predicted by the dynamically compiled convolution neural network and model. For example, digital image 404 may be representative of instance image data corresponding to a six channel digital image, each channel of the six channels representing an individual human being predicted to be depicted in the raw image data.

In various embodiments, each channel of the plurality of channels may be represented by different colors/shades/patterns in a multi-channel image. In various embodiments, digital image 404 is a digital image constructed by according pixel color values to the one or more channels of the instance image data. A digital image such as digital image 404 may be formed instance image data to visually represent one or more determined instance channels. For example, each instance of a human being in digital image 404 in represented by a distinct solid color. Each channel not associated with aspects of a human being instance may be represented by different pixel values in a separate semantic image channel.

Figure 4D:
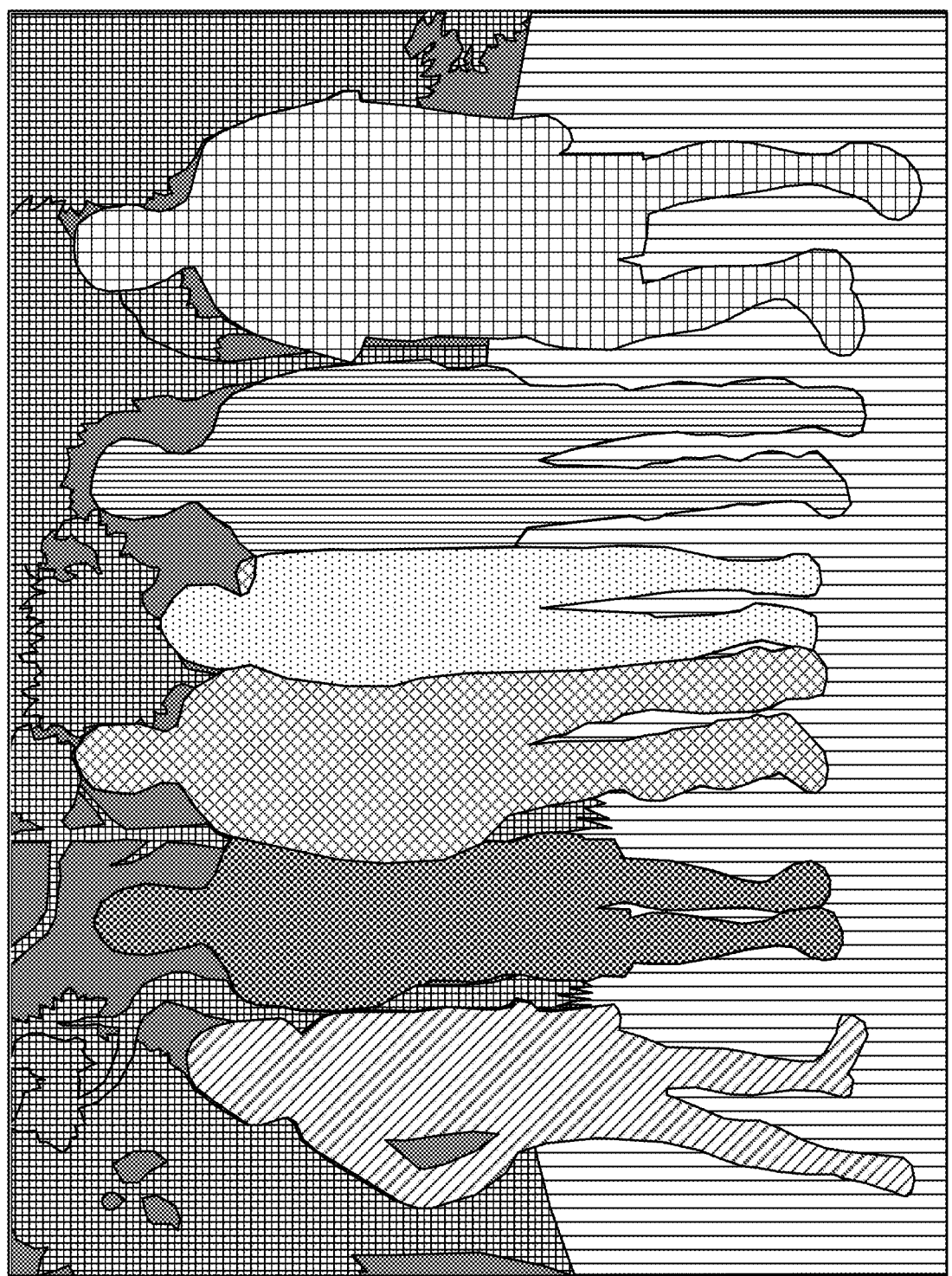

FIG. 4D depicts digital image 406 in an instance-channel image format. The instance-channel image format may correspond to generated instance image data generated as output of a panoptic generator or panoptic generator model. The format of digital image 406 may be a multi-channel image corresponding to recognized instances in the digital image 406 as well as recognized semantic regions in the digital image 408. In various, each channel of a plurality of channels corresponding to instance objects may be represented by different colors/shades/patterns in a multi-channel image.

Semantic regions identified according to semantic data and/or a semantic model may be further represented by additional distinct colors. For example, each instance of a human being in digital image 406 in represented by a distinct solid color. Additionally, a number of semantic regions may be further represented by additional distinct colors, each corresponding to a detected semantic region. For example, digital image 406 depicts, in addition to the plurality of instance objects, semantic regions for a ground, foliage, and a sky, with each instance and region associated with a distinct visual pattern.

Figure 5A:
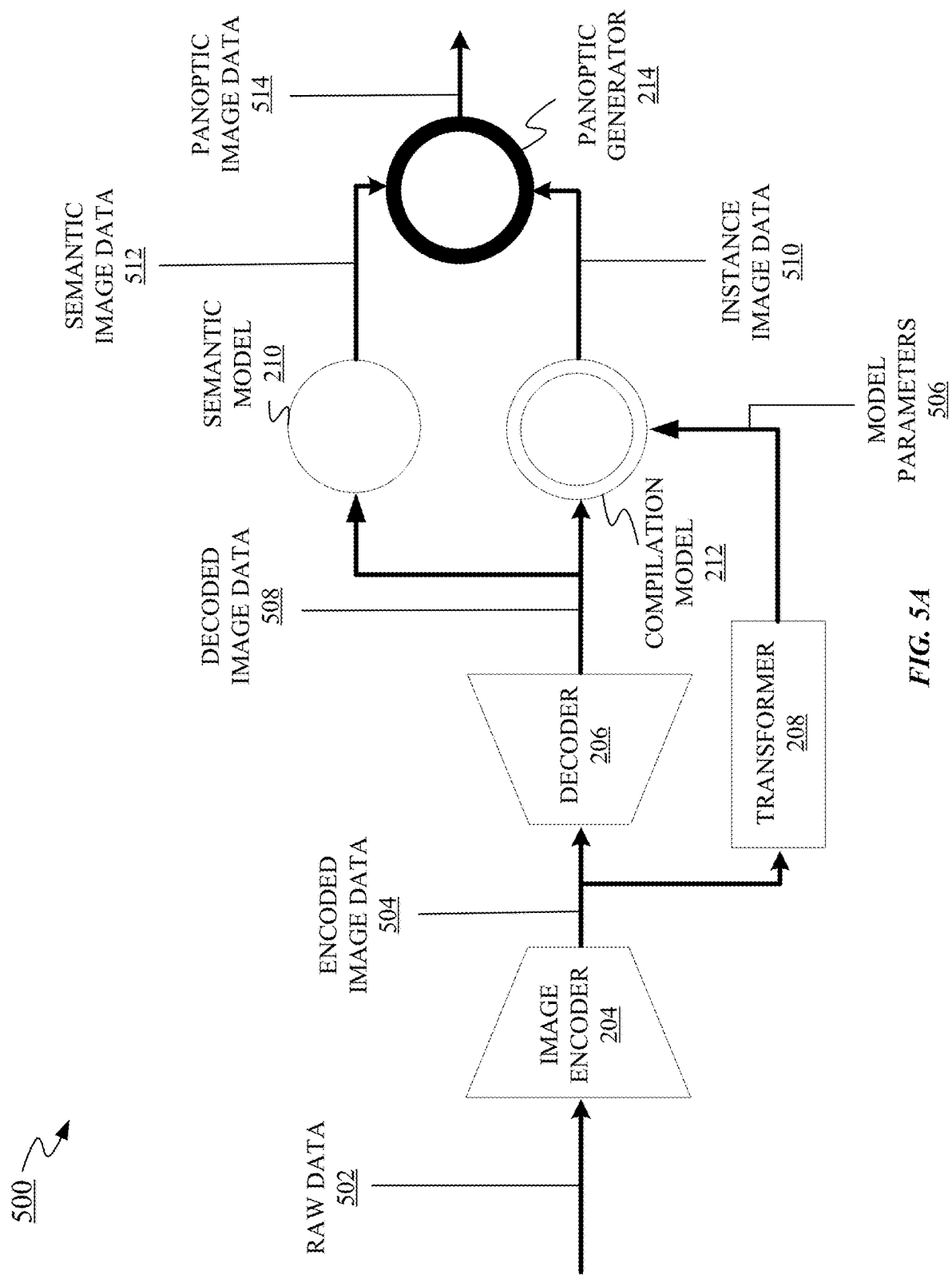
FIGS. 5A-5B show a diagram and flow of system components and data for generating panoptic image data according to various embodiments.
Figure 5B:
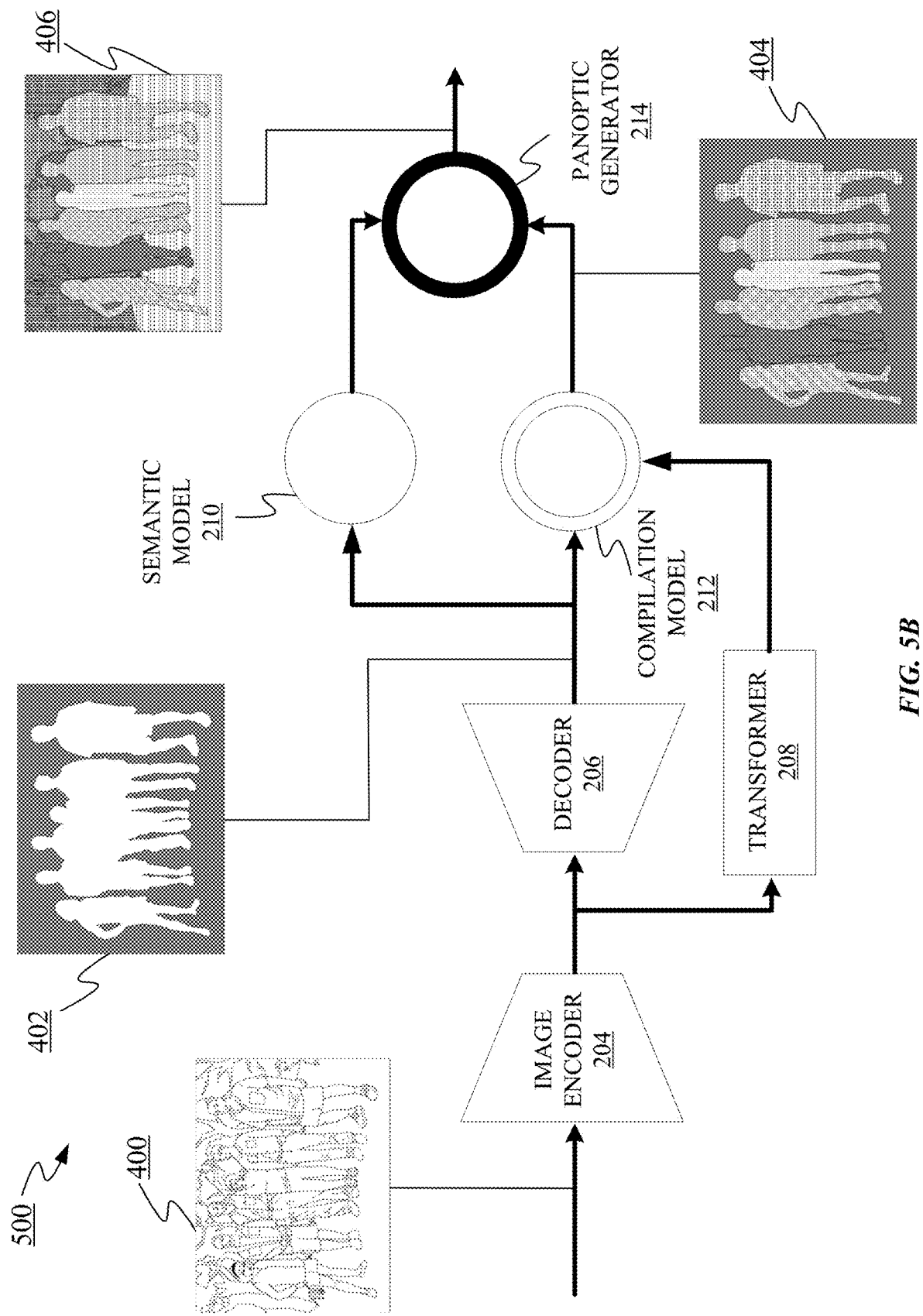

FIGS. 5A-5B show a diagram and flow of system components and data for generating panoptic image data according to various embodiments. Specifically FIGS. 5A and 5B depict a diagram and flow of data among subsystems for generating panoptic image data. FIG. 5 comprises system 500. System 500 may comprise image encoder 204. Image encoder 204 may be an encoder system including a convolutional neural network system and/or model for encoding image data. In various embodiments, image encoder 204 receives, as input, raw data 502. Raw data 502 may be raw image data received directly from a sensor such as sensor 104 or a sensor capture subsystem such as sensor capture subsystem 106. The raw image data may comprise a digital image in an image format such as JPEG, PNG or another standard image format.

Raw data 502 in input into image encoder 204 to produce encoded image data 504. Encoded image data 504 may be routed independently and in parallel to additional entities of system 500. For example, encoded image data 504 may be routed to decoder 206 and transformer 208. Decoder 206 may be a decoder which accepts, as input, encoded image data 504. In various embodiments, decoder 206 is configured to accept encoded pixel data from an image encoder as input. In various embodiments, decoder 206 is configured to determine a type of input coming from image encoder 204. In response to determining the type of input, decoder 206 may access one or more decoding models for decoding that type of input. In various embodiments, decoder 206 comprises a convolutional neural network system and/or model for decoding input encoded image data 504.

In parallel to the decoder 206 receiving the encoded image data 504, the transformer 208 may also receive encoded image data 504. Transformer 208 may be a transformer which accepts, as input, encoded image data 504. In various embodiments, transformer 208 is configured to accept encoded pixel data from an image encoder as input. In various embodiments, transformer is configured to determine a type of input coming from image encoder 204. In response to determining the type of input, transformer 208 may access one or more transformational neural network models for processing that type of input. In various embodiments, transformer 208 is configured to process input encoded image data 504 to produce one or more model parameters 506. Model parameters 506 may be data parameters and/or values in format acceptable for input and use by a dynamically compiled convolutional neural network. In various embodiments, transformer 208 utilizes a transformer neural network to map one or more inputs, such as encoded pixel data, into one or more dynamically compiled parameters. In various embodiments, transformer 208 utilizes a transformer neural network to determine one or more weight parameters. In various embodiments, the one or more weight parameters may be input into a dynamically compiled convolutional neural network to alter the function the neural network to predict one or more channels of output. For example, one or more weight parameters may alter the function of a dynamically compiled convolutional neural network model to be biased toward predicting a certain number of output channels, toward utilizing particular nodes of a convolutional neural network more heavily, etc.

Decoder 206 may be configured to take in, as input, encoded image data 504 to cause outputting of decoded image data 508. In various embodiments, decoded image data 508 is image data comprising one or more channels. In various embodiments, the one or more channels are semantic channels corresponding to one or more predicted contiguous regions belonging a certain type of entity within a digital image. The semantic channels may comprise channels associated with known semantic regions and unknown instance regions. For example, the one or more channels of the decoded image data 508 may correspond to predicted image regions corresponding to human-adjacent channels such as "teeth," "hair," "human," "skin", "glasses", "clothing," etc. In order to determine a number of instances corresponding to these semantic channels, the decoded image data 508 may be further input into a machine learning model, such as a dynamically compiled convolutional neural network.

The decoded image data 508 may be input, independently and in parallel, to one or more entities in system 500. In various embodiments, the decoded image data 508 may be input to one or more semantic models such as semantic model 210. Semantic model 210 may be a convolutional neural network system and/or model which is configured to receive, as input, decoded image data comprising one or more semantic channels. The semantic model 210 may parse the one or more semantic channels of the image data to determine one or more amorphous, background, or otherwise known semantic shapes or configurations. The semantic model 210 may then store information related to a semantic image, the semantic image comprising one or more indications of one or more known semantic regions of a digital image. In various embodiments, the semantic model 210 may output semantic image data 512 comprising one or more known semantic regions of a digital image.

The decoded image data 508 may also be input, independently and in parallel, to a dynamically compiled convolutional neural network such as compilation model 212. In various embodiments, compilation model 212 is a dynamically compiled convolutional neural network configured to receive decoded image data 508 as input and parse the data according to one or more dynamically generated model parameters 506 output from a transformer 208. In various embodiments, compilation model 212 utilizes one or more convolutional mapping models to cause mapping between one or more channels of decoded image data and one or more instance channels according to the one or more model parameters 506. For example, compilation model 212 may be configured to intake "X" channels of image data, and parse the channels according to "w" operations parameters to produce "N" channels of instance data, wherein "X" is a number of channels selected from decoded image data, "w" is a number of weighted parameters from a transformer, and "N" is a number of detected instances of objects in a digital image. The output instance image data 510 of compilation model 212 may comprise the one or more instance channels corresponding to "N" predicted instances of an object in a raw digital image.

In various embodiments, system 500 may comprise a combination model for generation panoptic data, such as panoptic generator 214. In various embodiments, panoptic generator 214 is configured to receive, as input, instance image data 510 and semantic image data 512. The panoptic generator 214 may then be configured to use the input to generated output panoptic image data 514. The panoptic image data 514 may be a combined digital image comprising both instance indicators for one or more instance objects and semantic indicators for one or more semantic regions.

FIG. 5B depicts a diagram and flow of data among subsystems for generating panoptic image data. Specifically, FIG. 5B depicts system 500 along with the various stages of digital image 400 during an example panoptic image data generation process. For example, as depicted in FIG. 5B, raw image data such as digital image 400 is input into image encoder 204. Digital image 400 is therein converted to encoded image data which is sent in parallel to transformer 208 and decoder 206. Transformer 208 may then use the encoded image data to generated one or more model parameters for compilation model 212. Decoder 206 may output decoded image data such as digital image 402 comprising one or more image channels. The decoded image data is then sent in parallel to semantic model 210 and compilation model 212. Semantic model 210 may determine one or more semantic regions in digital image 402. Compilation model 212 may parse the decoded image data comprising digital image 402 to produce instance images data such as digital image 404. Instance image data such as digital image 404 may then be input to a panoptic generator 214 along with semantic data from semantic model 210. The output of panoptic generator 214 may be panoptic image data such as digital image 406 comprising one or more instance channels for each predicted instance object and one or more semantic channels for each predicted semantic region.

Figure 6:
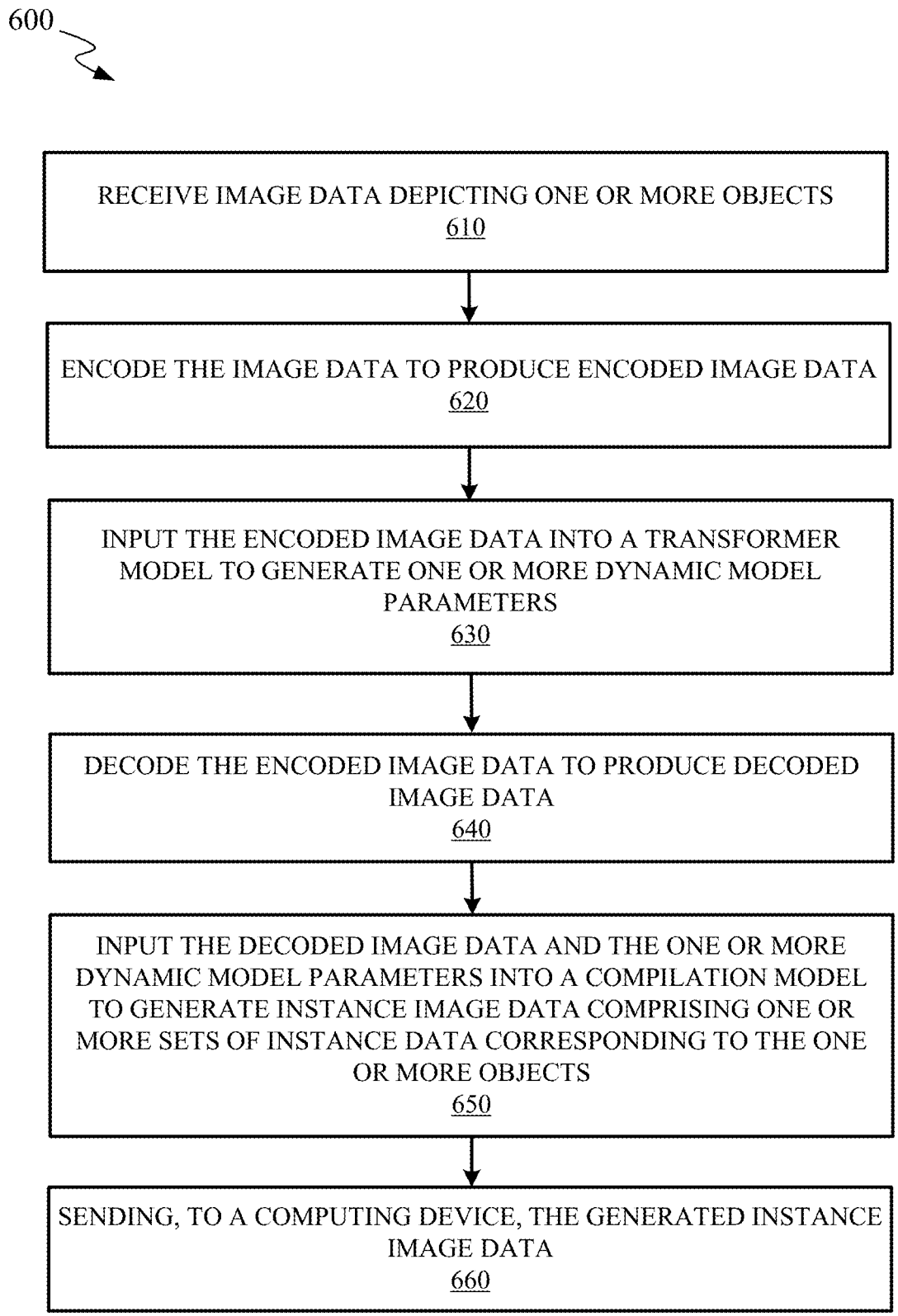
FIG. 6 shows an exemplary process for generating and sending instance image data using dynamic model parameters according to various embodiments.

FIG. 6 shows an exemplary process for generating instance image data using dynamic model parameters according to various embodiments. Specifically, FIG. 6 depicts process 600 for generating instance image data using received image data. Process 600 starts at step 610 by receiving image data depicting one or more objects. The image data may be received by a system such as image data intake 202. The received image data may comprise a plurality of pixels representing a digital image. In an example embodiment, a digital picture depicting one or more automobiles as instance objects, and a sky, ground, street, and builds are amorphous regions is received.

At step 620, the process 600 comprises encoding the image data to produce encoded image data. The data may be produced by an encoder, such as image encoder 204. The encoded image data may be produced as output of a convolutional neural network encoder model which takes the received image data as input. In an example embodiment, an encoder generates encoded image data comprising a plurality of encoded pixel values corresponding to some aspects of the pixels comprised in the digital image.

At step 630, the process 600 comprises inputting the encoded image data into a transformer model to generate one or more dynamic model parameters. The transformer model may be a transformer such as transformer 208. The transformer may use the encoded image data to determine one or more predicted instances which may be present in the digital image. In an example, embodiment, a transformer neural network parses encoded pixel data to determine that one or more groupings of pixels likely correspond to a number of automobiles in the digital image. The transformer neural network may then output parameters for operating a convolutional neural network to produce instance image data.

At step 640, the process 600 comprises decoding the encoded image data to produce decoded image data. The image data may be decoded by a decoder, such as decoder 206. In various embodiments, the decoder utilizes encoded pixel data to parse the image data. The parsed image data may be used to generate a decoded output comprising one or more information channels. The one or more information channels may correspond to one or more instance semantic channels and/or one or more non-semantic channels. In various embodiments, the decoder generates a number of channels corresponding to a total number of detected channels in a decoded image. In various embodiments, the decoder generates a predetermined number of channels by selecting a number of most conspicuous channels from the decoded image data.

At step 650, the process 600 comprises inputting the decoded image data and the one or more dynamic model parameters into a compilation model to generate instance image data comprising one or more sets of instance data corresponding to the one or more objects. The compilation model may be a model such as compilation model 212. In various embodiments, the compilation model uses the decoded image data as input and the one or more parameters as machine learning parameters for outputting the instance image data. In various embodiments, the image instance data is image data comprising a number of channels equal to a number of predicted instances of an object in the original digital image. In various embodiments not depicted in FIG. 3, the instance data may be further combined with semantic data from a semantic model, such as semantic model 210 to create panoptic image data comprising instance entities and semantic entities.

At step 660, the process 600 comprises sending, to a computing device, the generated instance image data. The generated image data may be sent to one or more computing devices, such as a computing device comprising image management system 108. For example, sensor capture subsystem 106 may send raw image data to transformation subsystem 114 of transformation system 110. Once instance image data is generated in step 650, an image data output system such as image data output 216 may send the instance image data to a storage system such as storage 124. In various embodiments, process 600 is performed by a remote server computer communicatively coupled via network through network system 126 to a mobile computing device. For example, a mobile computing device comprising a sensor 104 may send, over a network, raw image data to the server computer comprising transformation subsystem 114. Transformation subsystem may then performed processes for generating instance image data internally before sending the data back to the mobile computing device at step 660.

Figure 7:
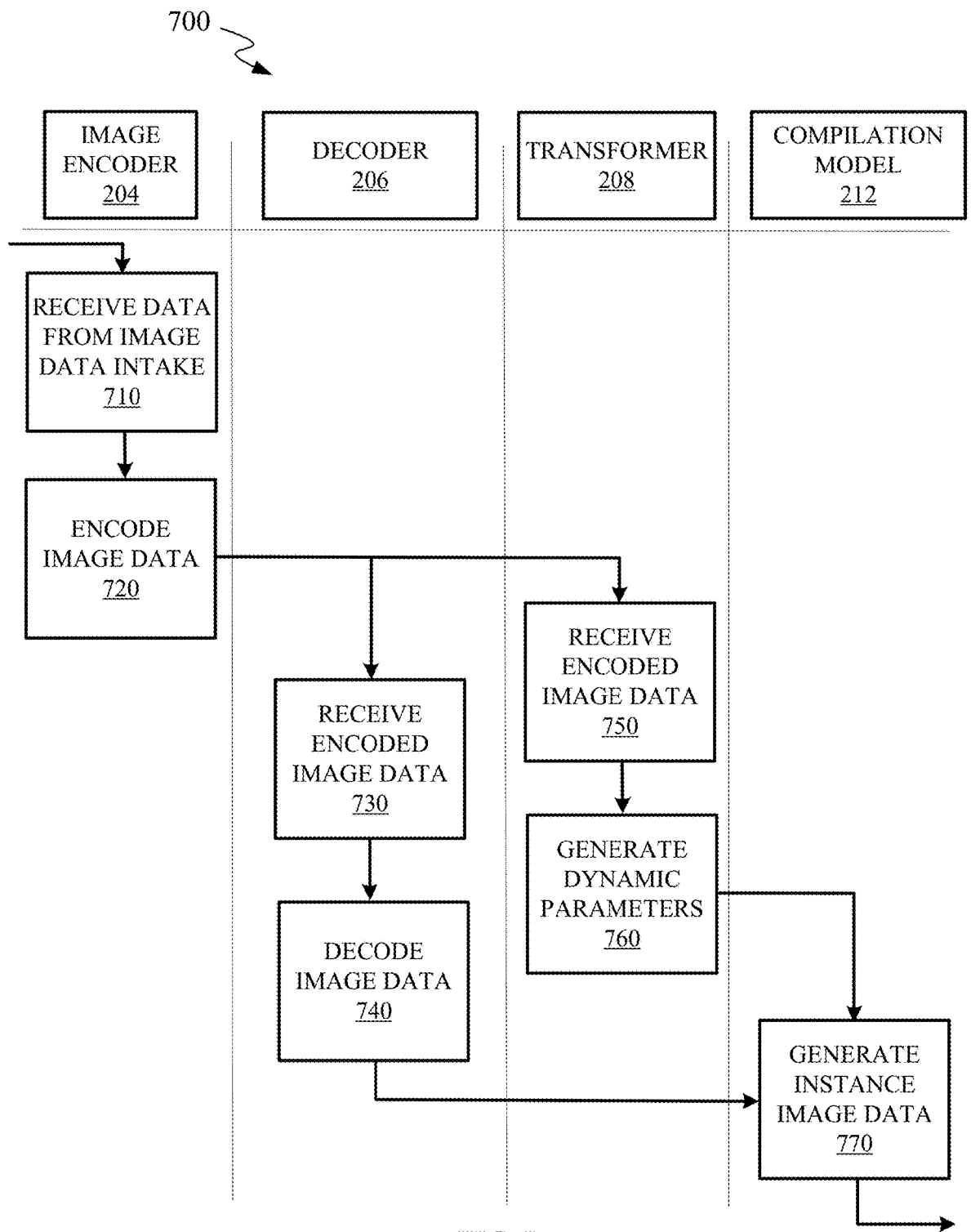
FIG. 7 shows an exemplary system and process for generating instance image data using a variety of system components according to various embodiments.

FIG. 7 shows an exemplary system and process for generating instance image data using a variety of system components according to various embodiments. Specifically, FIG. 7 depicts an example process 700 implemented by components of a system for generating instance image data. Process 700 begins at step 710 when an image encoder 204 receives data from an image data intake such as image data intake 202. In various embodiments, image data intake 202 may send received raw image data to the image encoder 204. The image encoder 204 may utilize a convolutional neural network encoding model to received, as input, the data from data image intake.

At step 720, the received data is used to encode image data at the image encoder 204. The received data may be input into the convolution neural network encoding model to cause the encoding of the image data. In various embodiments, the encoded image data comprises one or more encoded pixel values. For example, one or more encoded pixel values may correspond to determined characteristics of an array of pixels comprised in received raw image data. In various embodiments, encoding data may comprise mapping one or more raw values of raw data according to a mapping schema to produce one or more output values. For example, image encoder 204 may be a static convolutional neural network previously trained to map one or more pixel values of a raw image dataset to one or more new pixel values of an encoded image data set.

At step 730, the encoded image data from image encoder 204 is sent to, and received by, decoder 206. In various embodiments, the image encoder 204 is communicatively coupled to the decoder 206 via one or more hardwired or networked connections. For example, the image encoder 204 and decoder 206 may be part of the same hardware and software system, such as transformation system 110, or communicatively connected in different hardware devices over a network connection.

At step 740, the decoder 206 decodes the received image data. The received encoded image data may be input into a convolution neural network decoding model to cause the decoding of the encoded image data. In various embodiments, the decoded image data comprises one or more decoded channel values. For example, one or more decoded channel values may correspond to determined characteristics/regions of an array of pixels corresponding to a set of known categories comprised in decoded raw image data. In various embodiments, decoding data may comprise grouping one or more encoded data values according to a grouping/mapping schema to produce one or more output channels. For example, decoder 206 may be a static convolutional neural network previously trained to group one or more pixel values of an encoded image dataset to one or more new channel values of an encoded image data set.

At step 750, the encoded image data is sent to, and received by, transformer 208. The transformer may be communicatively coupled to the image encoder 204. In various embodiments, transformer 208 is instead communicatively coupled to the decoder 206 and will intercept encoded image data sent to the decoder 206 from the image encoder 204. At step 760, the transformer 208 generates dynamic parameters from the received encoded image data. The received encoded image data may be input into a transformer neural network model to cause the transformation of the encoded image data into one or more dynamically compiled parameters for training or operating a machine learning model. In various embodiments, the one or more dynamically compiled parameters comprise one or more dynamically compiled weight values for operating a machine learning model. For example, one or more compiled weight values may be input to a dynamically compiled convolutional neural network model to alter the operation of the model according to the weight values.

At step 770, the compilation model 212 receives decoded image data from the decoder 206 and dynamic parameters from the transformer 208 to cause generation of instance image data. The compilation model 212 may be a dynamically compiled convolutional neural network which may be trained and tested to refine the model. The compilation model may receive, as input the decoded image data from the decoder 206 and the dynamic parameters from the transformer 208 to operate the model. In various embodiments, the dynamically compiled convolutional neural network may operate by mapping an input of decoded image data to one or more instance channels of image data. The generated instance image data may then be sent to an output system such as image data output 216.

Figure 8A:
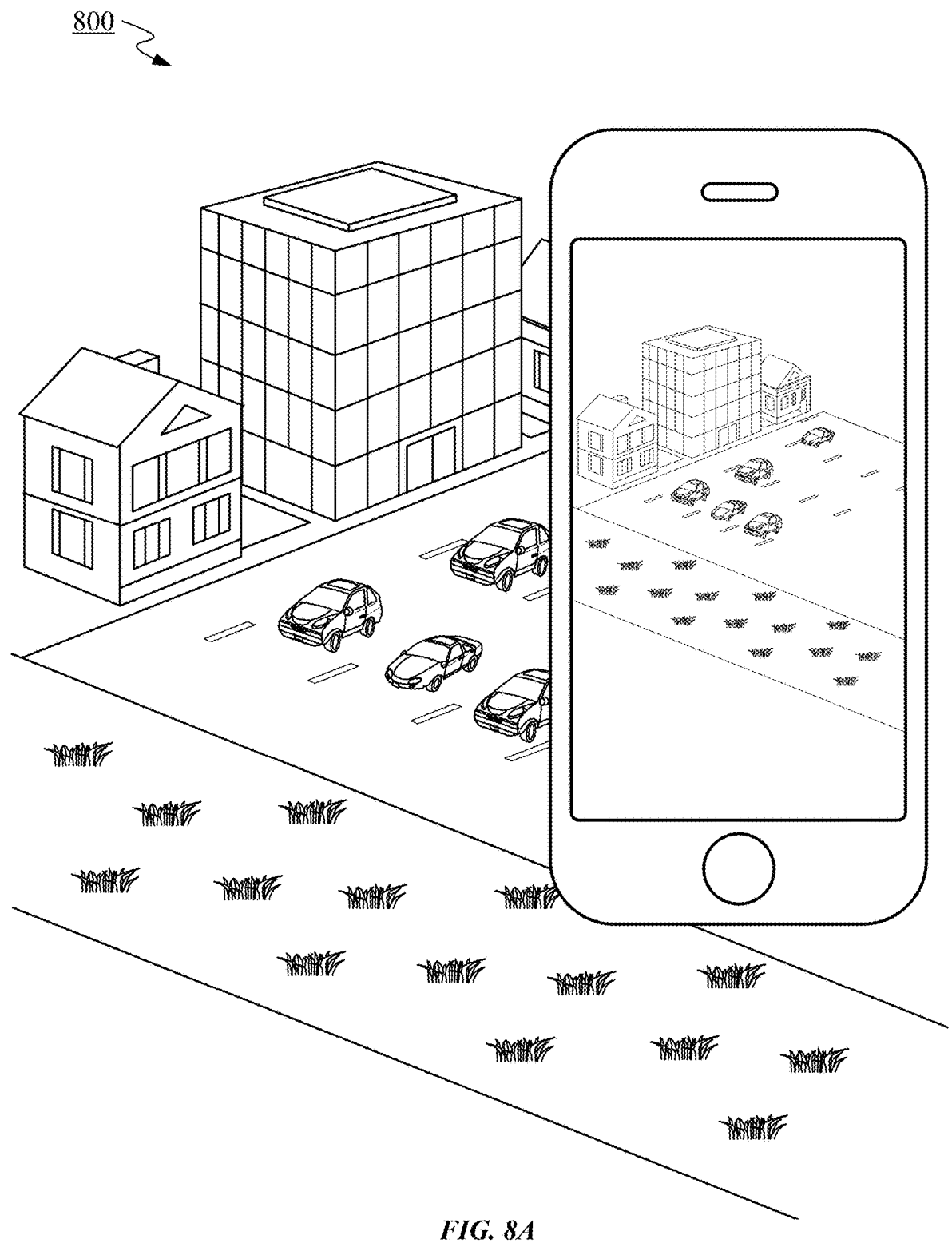
FIGS. 8A-8D shows exemplary diagrams illustrating generation of panoptic image data from raw image data according to various embodiments.

FIGS. 8A-8D shows exemplary diagrams illustrating the generation of panoptic image data from raw image data according to various embodiments. Specifically, FIGS. 8A-8D show various illustrative examples of image processing according to the embodiments described herein. FIG. 8A depicts a scene 800 comprising a mobile device and one or more physical entities, where the mobile device includes a digital display and camera for capturing a digital image. As depicted in FIG. 8A, the one or more physical entities are captured and displayed in a standard digital format similar to the appearances of the objects in physical space. For example, the digital image shows all features of a scene without limitation and/or augmentation, including several automobiles, buildings, and landscape features.

Figure 8B:
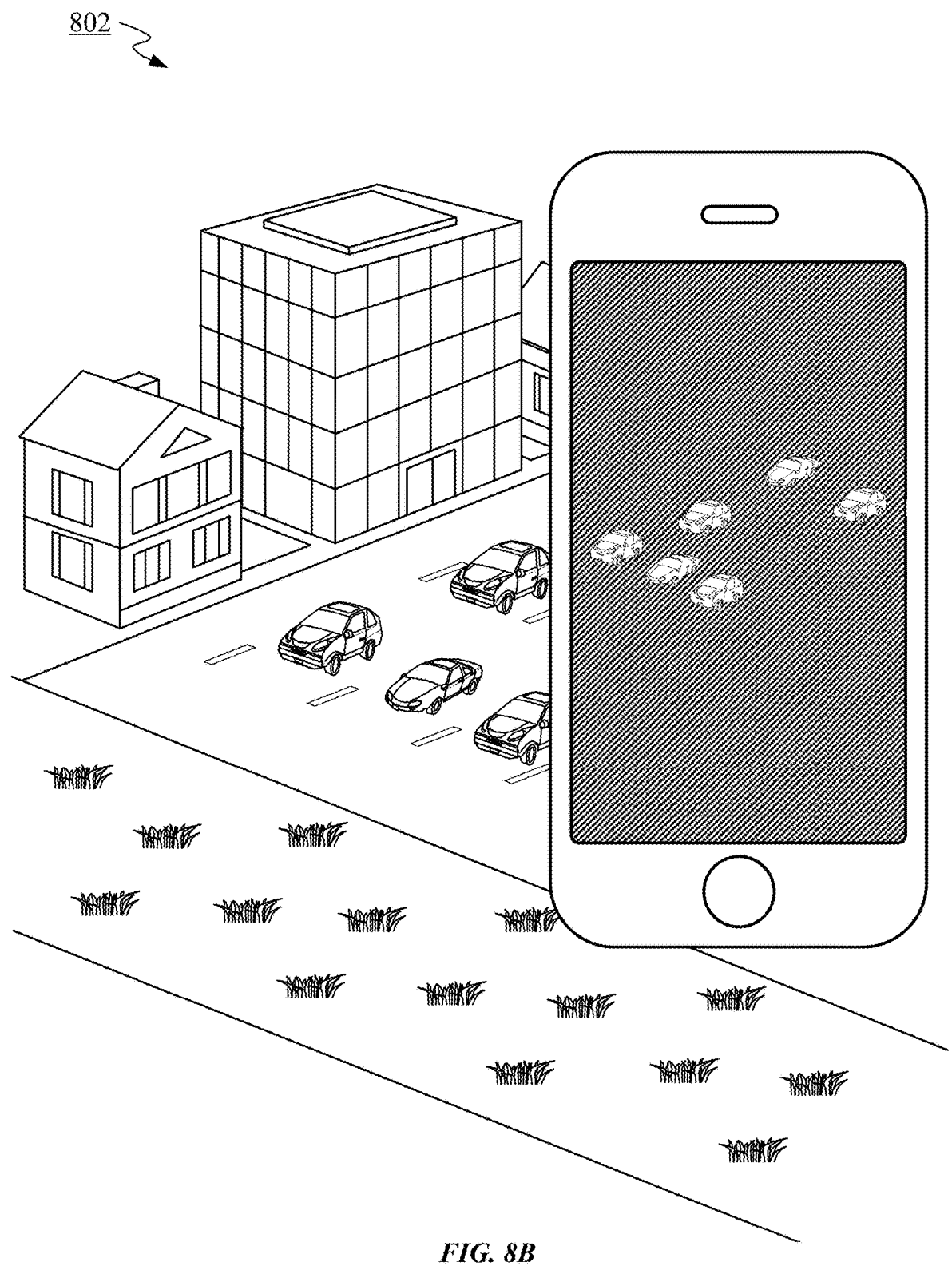

FIG. 8B depicts a scene 802 comprising the mobile device and the one or more physical entities. As depicted in FIG. 8B, the one or more physical entities are captured and displayed in a revised digital format similar to and/or based on the appearances of the objects in physical space. In various embodiments, the depiction of the one or more physical entities in FIG. 8B correspond to depictions of the output decoded image data from a decoder. FIG. 8B may show channels of detected objects in an image corresponding to detected instance objects. For example, the decoded image data may include one or more instance channel features of an automobile (i.e. tires, license plate, body, etc.), and one or more instance channel features of semantic regions. The semantic regions are excluded from the image, leaving only detected regions of instance-object channels.

Figure 8C:
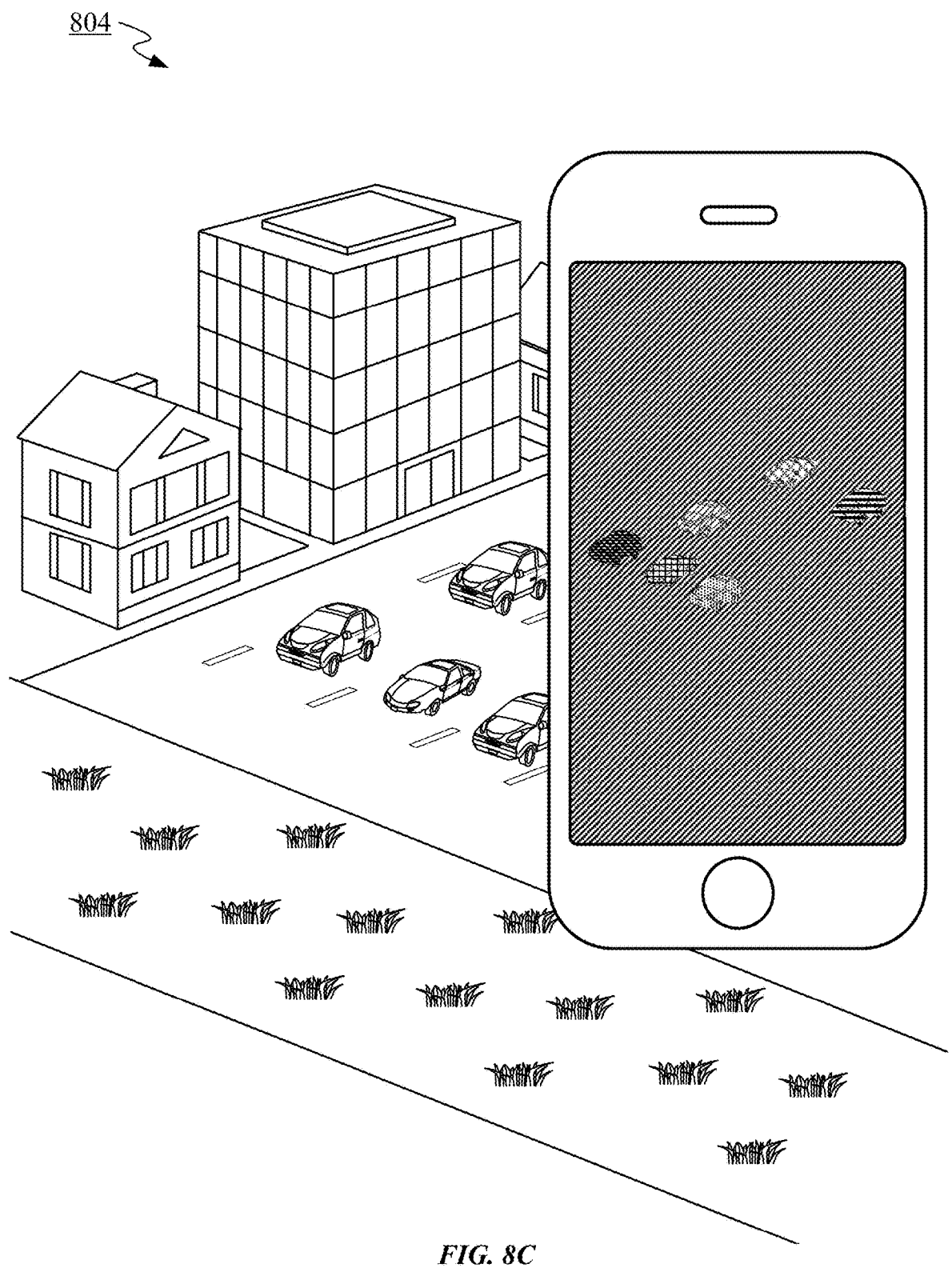

FIG. 8C depicts a scene 804 comprising the mobile device and the one or more physical entities. As depicted in FIG. 8C, the one or more physical entities are captured and displayed in a revised digital format similar based on the appearances of the objects in physical space. In various embodiments, the depiction of the one or more physical entities in FIG. 8C correspond to depictions of the output instance image data from a dynamically compiled convolutional neural network. FIG. 8C may show individual instances of detected objects in an image corresponding to the objects in a particular format. For example, the instance image data may include one or more instance object channels of automobile objects highlighted using individually distinct colors for each automobile. The semantic regions are excluded from the image, leaving only the individually distinct instance objects in the image.

Figure 8D:
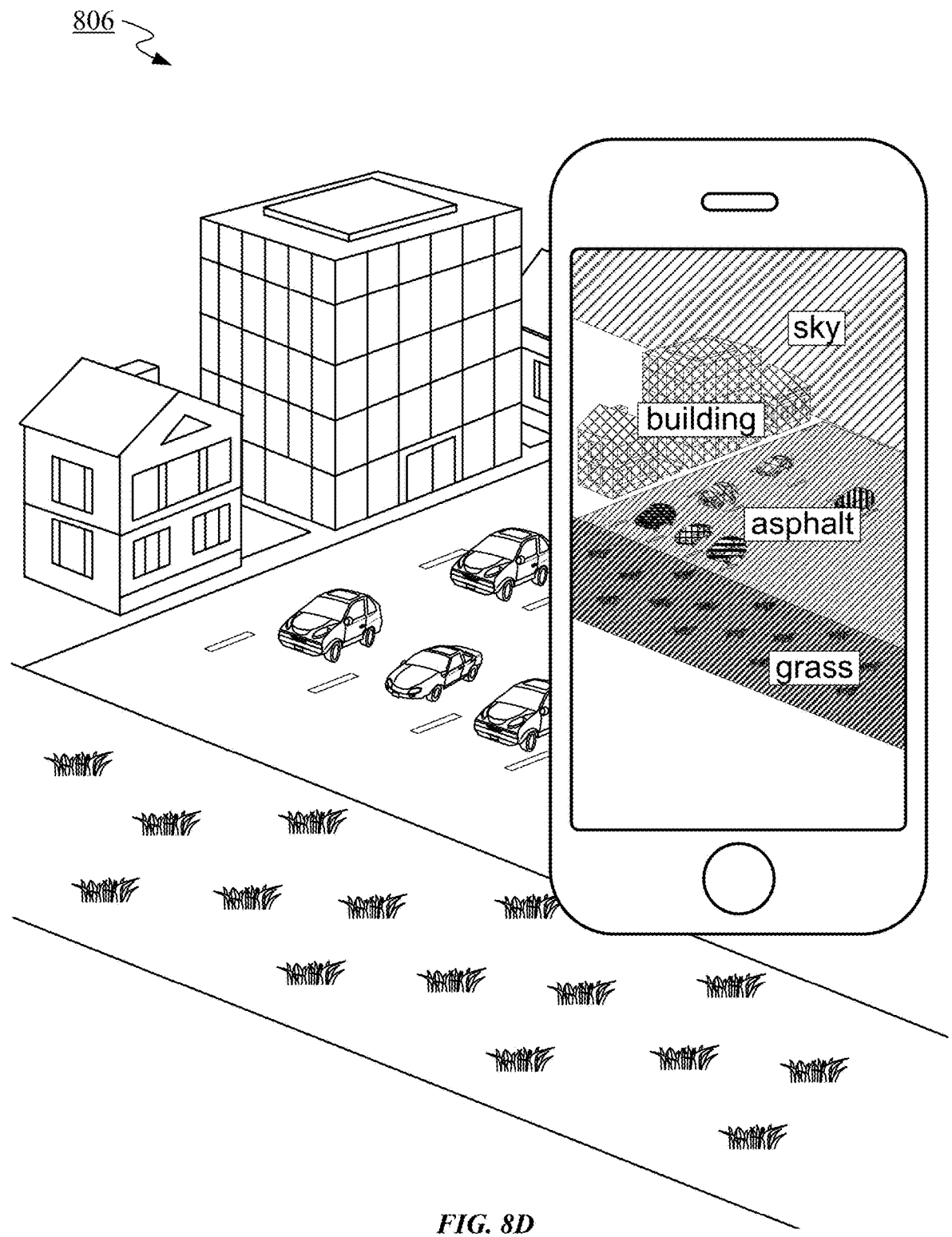

FIG. 8D depicts a scene 806 comprising the mobile device and the one or more physical entities. As depicted in FIG. 8D, the one or more physical entities are captured and displayed in a revised digital format similar based on the appearances of the objects in physical space. In various embodiments, the depiction of the one or more physical entities in FIG. 8D correspond to depictions of the output panoptic image data from a panoptic generator. FIG. 8D may show individual instances of detected objects in an image corresponding to the objects in a particular format along with one or more labelled amorphous regions. For example, the panoptic image data may include one or more instance object channels of automobile objects highlighted using individually distinct colors for each automobile. The panoptic image data may further comprise one or more amorphous region indicators corresponding to detected amorphous regions. For example, FIG. 5D depicts several amorphous labelled regions, including labelled regions for "grass", "asphalt", "building", and "sky."

In various embodiments, the methods described herein may be used as part of distance-based image smoothing techniques for improving digital image quality with convolutional neural networks. For example, raw image data comprising one or more instance objects at various distances may be received. The raw image data may be processed according to the embodiments described herein. The output instance image data may further include metadata associated with each detected instance channel corresponding to a relative distance between an instance object and the sensor at the time the digital image was generated. One or more processor executing instructions as part of a software application may cause refining of the original digital image to improve image quality for depicting instance objects that were farther away from the sensor at the time of capture. For example, a software application may use vector transformation techniques to change the color parameter values of one or more pixels to alter the boundary around an instance object. Objects farther from the sensor at the time of capture may have their boundary pixels altered to better distinguish the instance objects from semantic regions around the object.

In various embodiments, the methods described herein may be used as part of surface-tone-based image smoothing techniques for improving digital image quality with convolutional neural networks. For example, raw image data comprising one or more instance objects having various surface tones may be received. The raw image data may be processed according to the embodiments described herein. The output instance image data may further include metadata associated with each a mean-based surface tone of one or more instance objects within the digital image. One or more processor executing instructions as part of a software application may cause refining of the original digital image to improve image quality for depicting instance objects that were not optimally captured by existing lights in the original image. For example, a software application may use vector transformation techniques to change the color parameter values of one or more pixels to alter the relative brightness of certain surface tones. Certain instance objects which are subjected to glare may have pixel values decreased to lower the overall brightness of the surface tone. Certain instance objects that are difficult to discern due to darkness in the image may have pixel values increased to raise the overall brightness of the surface tone.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A computer-implemented method, comprising:
receiving image data depicting one or more objects;
encoding the image data to produce encoded image data;
inputting the encoded image data into a transformer model to generate one or more dynamic model parameters;
decoding the encoded image data to produce decoded image data;
inputting the decoded image data and the one or more dynamic model parameters into a compilation model to generate instance image data comprising one or more sets of instance data corresponding to the one or more objects; and
sending, to a computing device, the generated instance image data comprising the one or more sets of instance data.

2. The computer-implemented method of claim 1, wherein the received image data is raw image data comprising one or more channels of raw image data corresponding to color values of an image depicting the one or more objects.

3. The computer-implemented method of claim 1, wherein the decoded image data comprises one or more channels of decoded image data corresponding to characteristics of the received image data.

4. The computer-implemented method of claim 3, wherein at least a channel of decoded image data of the one or more channels of decoded image data corresponds to characteristic of the one or more objects.

5. The computer-implemented method of claim 3, wherein at least a channel of decoded image data of the one or more channels of decoded image data corresponds to an amorphous feature of the received image data.

6. The computer-implemented method of claim 1, further comprising:
generating, based at least in part on the decoded image data, semantic image data comprising one or more sets of semantic data corresponding to characteristics of one or more amorphous features of the received image data.

7. The computer-implemented method of claim 6, further comprising:
generating, based at least in part on the one or more sets of instance data and the one or more sets of semantic data, one or more sets of panoptic data corresponding to the one or more objects and the one or more amorphous features.

8. The computer-implemented method of claim 1, wherein encoding the received image data comprises transforming the received image data into encoded pixel data corresponding to a set of characteristics of a set of pixels comprising the received image data.

9. The computer-implemented method of claim 8, wherein the transformer model receives the encoded pixel data as input to cause generating the one or more dynamic model parameters, the one or more dynamic model parameters comprising one or more weighted parameters for causing the compilation model to generate the instance image data.

10. The computer-implemented method of claim 1, wherein the compilation model is a trainable dynamically compiled convolutional neural network.

11. A computing device, comprising:
a camera;
a processor;
one or more non-transitory computer-readable storage medium storing a plurality of instructions executable by the processor, the plurality of instructions when executed by the processor causing the processor to perform:
receiving, from the camera, image data depicting one or more objects;
encoding the image data to produce encoded image data;
inputting the encoded image data into a transformer model to generate one or more dynamic model parameters;
decoding the encoded image data to produce decoded image data;
inputting the decoded image data and the one or more dynamic model parameters into a compilation model to generate instance image data comprising one or more sets of instance data corresponding to the one or more objects; and
storing the generated instance image data comprising the one or more sets of instance data in a storage system of the computing device.

12. The computing device of claim 11, wherein the received image data is raw image data comprising one or more channels of raw image data corresponding to color values of an image depicting the one or more objects.

13. The computing device of claim 11, wherein the decoded image data comprises one or more channels of decoded image data corresponding to characteristics of the received image data.

14. The computing device of claim 13, wherein at least a channel of decoded image data of the one or more channels of decoded image data corresponds to characteristic of the one or more objects.

15. The computing device of claim 13, wherein at least a channel of decoded image data of the one or more channels of decoded image data corresponds to an amorphous feature of the received image data.

16. The computing device of claim 11, the plurality of instructions when executed by the processor further causing the processor to perform:
generating, based at least in part on the decoded image data, semantic image data comprising one or more sets of semantic data corresponding to characteristics of one or more amorphous features of the received image data.

17. The computing device of claim 16, the plurality of instructions when executed by the processor further causing the processor to perform:
generating, based at least in part on the one or more sets of instance data and the one or more sets of semantic data, one or more sets of panoptic data corresponding to the one or more objects and the one or more amorphous features.

18. The computing device of claim 11, wherein encoding the received image data comprises transforming the received image data into encoded pixel data corresponding to a set of characteristics of a set of pixels comprising the received image data.

19. The computing device of claim 18, wherein the transformer model receives the encoded pixel data as input to cause generating the one or more dynamic model parameters, the one or more dynamic model parameters comprising one or more weighted parameters for causing the compilation model to generate the instance image data.

20. A non-transitory computer-readable storage medium storing a plurality of instructions executable by one or more processors, the plurality of instructions, when executed by the one or more processors, causing the one or more processors to perform:
receiving image data depicting one or more objects;
encoding the image data to produce encoded image data;
inputting the encoded image data into a transformer model to generate one or more dynamic model parameters;
decoding the encoded image data to produce decoded image data;
inputting the decoded image data and the one or more dynamic model parameters into a compilation model to generate instance image data comprising one or more sets of instance data corresponding to the one or more objects; and
sending, to a computing device, the generated instance image data comprising the one or more sets of instance data.

* * * * *